(12) United States Patent
Cummings et al.

(10) Patent No.: US 12,130,430 B2
(45) Date of Patent: Oct. 29, 2024

(54) SYSTEM FOR VIRTUAL DISPLAY AND METHOD OF USE

(71) Applicant: Timothy A. Cummings, Fort Worth, TX (US)

(72) Inventors: Timothy A. Cummings, Fort Worth, TX (US); David K. Hess, Dallas, TX (US); Marvin R. Young, Richardson, TX (US)

(73) Assignee: Timothy Cummings, Fort Worth, TX (US)

( * ) Notice: Subject to any disclaimer, the term of this patent is extended or adjusted under 35 U.S.C. 154(b) by 332 days.

(21) Appl. No.: 17/649,445

(22) Filed: Jan. 31, 2022

(65) Prior Publication Data

US 2022/0155592 A1 May 19, 2022

Related U.S. Application Data

(63) Continuation-in-part of application No. 17/301,202, filed on Mar. 29, 2021, now Pat. No. 11,237,392, (Continued)

(51) Int. Cl.
*G06T 19/00* (2011.01)
*G01C 15/02* (2006.01)
(Continued)

(52) U.S. Cl.
CPC ......... *G02B 27/0101* (2013.01); *G01C 15/02* (2013.01); *G02B 27/0172* (2013.01);
(Continued)

(58) Field of Classification Search
None
See application file for complete search history.

(56) References Cited

U.S. PATENT DOCUMENTS 8,139,087 B2   3/2012   Kuroki et al.
8,482,859 B2   7/2013   Border et al.
(Continued)

FOREIGN PATENT DOCUMENTS

CN    101655786 A    2/2010
KR    20120020303 A   3/2012
(Continued)

OTHER PUBLICATIONS

"CADMS: an Indoor Positioning System for Disaster Management," printed Oct. 15, 2014, Institute of Building Informatics, portal.tugraz.at, undated, http://portal.tugraz.at/portal/page/portal/TU_Graz/Einrichtungen/Institute/Homepages/i2330/CADMS, 7 pp.
(Continued)

*Primary Examiner* — Nicholas R Wilson
(74) *Attorney, Agent, or Firm* — Schultz & Associates, P.C.

(57) ABSTRACT

A preferred system and method for displaying a building information model includes a system administrator, and a headset unit removably attached to a construction hardhat via a set of clips. The headset further includes a set of stereo cameras. The cameras capture an image of the construction site to orient the user view and overlay an image. A position of the headset is determined relative to a registration marker using the cameras and motion sensors. The overlayed image is projected to the display based on the position and orientation of the headset.

9 Claims, 37 Drawing Sheets

Related U.S. Application Data which is a continuation of application No. 15/929,831, filed on May 25, 2020, now Pat. No. 10,962,774, which is a continuation-in-part of application No. 16/378,156, filed on Apr. 8, 2019, now Pat. No. 10,739,590, which is a continuation of application No. 15/671,016, filed on Aug. 7, 2017, now Pat. No. 10,254,540, which is a continuation of application No. 14/674,967, filed on Mar. 31, 2015, now Pat. No. 9,726,885.

(51) Int. Cl.
| | |
|---|---|
| *G02B 27/01* | (2006.01) |
| *H04N 13/344* | (2018.01) |
| *H04N 23/58* | (2023.01) |
| *H04N 23/69* | (2023.01) |
| *H04N 23/698* | (2023.01) |
| *H04N 23/90* | (2023.01) |

(52) U.S. Cl.
CPC ..... *G02B 27/0176* (2013.01); *G02B 27/0179* (2013.01); *G06T 19/006* (2013.01); *H04N 13/344* (2018.05); *H04N 23/58* (2023.01); *H04N 23/69* (2023.01); *H04N 23/698* (2023.01); *H04N 23/90* (2023.01); *G02B 2027/0123* (2013.01); *G02B 2027/0138* (2013.01); *G02B 2027/0178* (2013.01); *G02B 2027/0181* (2013.01); *G02B 2027/0187* (2013.01)

(56) References Cited

U.S. PATENT DOCUMENTS

| | | | |
|---|---|---|---|
| 8,768,609 | B2 | 7/2014 | Maynard et al. |
| 8,855,719 | B2 | 10/2014 | Jacobsen et al. |
| 2002/0080094 | A1 | 6/2002 | Biocca et al. |
| 2006/0028400 | A1 | 2/2006 | Apstun et al. |
| 2007/0027732 | A1 | 2/2007 | Hudgens |
| 2007/0136026 | A1 | 6/2007 | Heap |
| 2011/0276886 | A1 | 11/2011 | Hall et al. |
| 2012/0050326 | A1 | 3/2012 | Tanaka |
| 2012/0068913 | A1* | 3/2012 | Bar-Zeev ............ G02B 27/017 345/8 |
| 2012/0119978 | A1 | 5/2012 | Border et al. |
| 2012/0274653 | A1 | 11/2012 | Tang et al. |
| 2013/0009993 | A1* | 1/2013 | Horseman ............ G16H 40/63 345/633 |
| 2013/0069985 | A1 | 3/2013 | Wong et al. |
| 2013/0096873 | A1 | 4/2013 | Rosengaus et al. |
| 2013/0135180 | A1 | 5/2013 | McCulloch et al. |
| 2013/0138606 | A1 | 5/2013 | Kahle et al. |
| 2013/0154913 | A1 | 6/2013 | Genc et al. |
| 2013/0169681 | A1 | 7/2013 | Rasane et al. |
| 2013/0282345 | A1 | 10/2013 | McCulloch et al. |
| 2014/0022281 | A1 | 1/2014 | Georgeson et al. |
| 2014/0095119 | A1 | 4/2014 | Lee et al. |
| 2014/0184643 | A1 | 7/2014 | Friend |
| 2014/0210856 | A1 | 7/2014 | Finn et al. |
| 2014/0210858 | A1 | 7/2014 | Kim |
| 2014/0247278 | A1 | 9/2014 | Samara et al. |
| 2014/0253541 | A1 | 9/2014 | Schmidt |
| 2014/0268064 | A1 | 9/2014 | Kahle et al. |
| 2014/0282911 | A1 | 9/2014 | Bare et al. |
| 2014/0300632 | A1 | 10/2014 | Laor |
| 2014/0354528 | A1 | 12/2014 | Laughlin et al. |
| 2015/0130355 | A1 | 5/2015 | Rains et al. |
| 2015/0199847 | A1 | 7/2015 | Johnson et al. |
| 2016/0044276 | A1 | 2/2016 | Shearman et al. |
| 2016/0057511 | A1 | 2/2016 | Mullins et al. |
| 2016/0179336 | A1 | 6/2016 | Ambrus et al. |
| 2017/0053042 | A1 | 2/2017 | Sugden et al. |
| 2017/0315697 | A1 | 11/2017 | Jacobson et al. |
| 2018/0012125 | A1 | 1/2018 | Ladha et al. |
| 2020/0286289 | A1 | 9/2020 | Mitchell |

FOREIGN PATENT DOCUMENTS

| | | |
|---|---|---|
| WO | 2010045271 A1 | 4/2010 |
| WO | 2014047402 A1 | 3/2014 |
| WO | 2014068482 A1 | 5/2014 |

OTHER PUBLICATIONS

Feiner, et al., "Augmented Reality for Construction," printed Oct. 15, 2014, Columbia University, monet.cs.columbia.edu, undated, http://monet.cs.columbia.edu/projects/arc/arc.html, 6 pp.

Grayson, W., "VIDEO: FieldLens demos Google Glass for construction jobsite collaboration and reporting," Conexpo-Con/AGG: Complete Coverage, equipmentworld.com, Mar. 7, 2014, http://monet.cs.columbia.edu/projects/arc/arc.html, 7 pp.

Griffith, E., "Search: How do I punch this rivet hole?," fortune.com, Oct. 9, 2014, http://fortune.com/2014/10/09/wearable-technology-blue-collar-jobs, 8 pp.

"NEW Wearable and Mobile Applications of Augmented Reality for Construction," printed Oct. 15, 2014, smartbidnet.com, undated, http://smartbidnet.com/new-wearable-mobile-applications-augmented-realityconstruction/, 3 pp.

* cited by examiner

```
private SensorManagermSensorManager;
...
// Rotation matrix based on current readings from
accelerometer and magnetometer.
final float[] rotationMatrix= new float[9];
mSensorManager.getRotationMatrix(rotationMatrix,
null,
accelerometerReading, magnetometerReading);
// Express the updated rotation matrix as three
orientation angles.
final float[] orientationAngles= new float[3];
mSensorManager.getOrientation(rotationMatrix,
orientationAngles);
```

FIG. 27

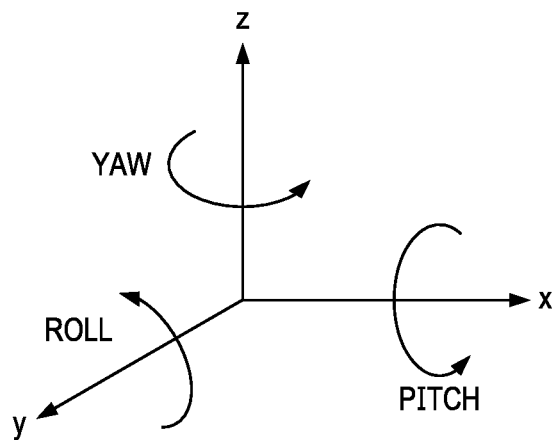

FIG. 28

```
public class SensorAcvitity extends Activity implements SensorEventListener { private SensorManager mSensorManager;
    private final float[] mAcceleratorReading = new float[3];
    private final float[] mMagnetometerReading = new float[3];

private final float[] mRotationMatrix = new float[9];
    private final float[] mOrientationAngles = new float[3];

@Override
    public void onCreate(Bundle savedInstanceState) {
        super.onCreate(savedInstanceState);
        setContentView(R.layout.main);
        mSensorManager = (SensorManager) getSystemService(Context.SENSOR_SERVICE);
    }

@Override
    public void onAccuracyChanged(Sensor sensor, int accuracy) {
        // Do something here if sensor accuracy changes.
        // You must implement this callback in your code.
    }

@Override
    protected void onResume() {
        super.onResume();

// Get updates from the accelerometer and magnetometer at a constant rate.
        // To make batch operations more efficient and reduce power consumption,
        // provide support for delaying updates to the application.
        //
        // In this example, the sensor reporting delay is small enough such that
        // the application receives an update before the system checks the sensor
        // readings again.
        mSensorManager.registerListener(this, Sensor.TYPE_ACCELEROMETER,
                SensorManager.SENSOR_DELAY_NORMAL,
                SensorManager.SENSOR_DELAY_UI);
        mSensorManager.registerListener(this, Sensor.TYPE_MAGNETIC_FIELD,
                SensorManager.SENSOR_DELAY_NORMAL,
                SensorManager.SENSOR_DELAY_UI);
    }
```

FIG. 29A

```
@Override
protected void onPause() {
        super.onPause();

// Don't receive any more updates from either sensor.
        mSensorManager.unregisterListener(this);
}

// Get readings from accelerometer and magnetometer. To simplify calculations,
// consider storing these readings as unit vectors.
@Override
public void onSensorChanged(SensorEvent event) {
        if (event.sensor == Sensor.TYPE_ACCELEROMETER) {
                System.arraycopy(event.values, 0, mAccelerometerReading,
                    0, mAccelerometerReading.length);
        }
        else if (event.sensor == Sensor.TYPE_MAGNETIC_FIELD) {
                System.arraycopy(event.values, 0, mMagnetometerReading,
                    0, mMagnetometerReading.length);
        }
}

// Compute the three orientation angles based on the most recent readings from
// the device's accelerometer and magnetometer.
public void updateOrientationAngles() {
        // Update rotation matrix, which is needed to update orientation angles.
        mSensorManager.getRotationMatrix(mRotationMatrix, null,
            mAccelerometerReading, mMagnetometerReading);

// "mRotationMatrix" now has up-to-date information.

mSensorManager.getOrientation(mRotationMatrix, mOrientationAngles);

// "mOrientationAngles" now has up-to-date information.
    }
}
```

FIG. 29B

SYSTEM FOR VIRTUAL DISPLAY AND METHOD OF USE

CROSS-REFERENCE TO RELATED APPLICATIONS

This application is a continuation-in-part of U.S. patent application Ser. No. 17/301,202, filed on Mar. 29, 2021, now U.S. Pat. No. 11,237,392 granted on Feb. 1, 2022, which is a continuation of U.S. patent application Ser. No. 15/929,831, filed on May 25, 2020, now U.S. Pat. No. 10,962,774 granted on Mar. 30, 2021, which is a continuation-in-part of U.S. patent application Ser. No. 16/378,156 filed on Apr. 8, 2019, now U.S. Pat. No. 10,739,590 granted on Aug. 11, 2020, which is a continuation of U.S. patent application Ser. No. 15/671,016, filed on Aug. 7, 2017, now U.S. Pat. No. 10,254,540 granted on Apr. 9, 2019, which is a continuation of U.S. patent application Ser. No. 14/674,967, filed Mar. 31, 2015, now U.S. Pat. No. 9,726,885 granted on Aug. 8, 2017. The above-identified patent applications are incorporated herein by reference in their entirety to provide continuity of disclosure.

FIELD OF THE INVENTION

The present invention relates to systems and methods for managing distribution and use of information at a construction site. In particular, the present invention relates to systems and methods for displaying and using a building information model and other construction information at a construction site. The present invention also relates to virtual display systems, such as heads up displays.

BACKGROUND OF THE INVENTION

A major goal of any contractor in the building industry is timely job completion. Hence, efficiency is a paramount concern.

Scheduling of construction projects often requires numerous subtasks. The subtasks are often interdependent. These subtasks must necessarily be completed in order to maximize efficiency. For example, electrical conduit and foundation pads must be in place before installation of electrical equipment can begin. If an error is made in any interdependent subtask, it must be corrected before other tasks can proceed. Hence, correcting errors made in interdependent subtasks is expensive and time consuming because it often delays project completion.

As an example, heavy equipment such as cranes and elevators are scheduled to be on site at specific times when they are needed. If errors in subtasks are made, then the equipment must be either stored or rescheduled quickly, leading to increased construction costs and delay in project completion.

In a similar way, delivery of certain engineering, mechanical and scheduling information is critical to timely project completion. For example, engineering change orders, site drawings, schematics, photographs, tool type and location, physical equipment specifications and diagrams and repair manuals and parts lists for heavy equipment all are required to be easily available at a construction site for maximum efficiency. Other critical construction information includes queuing times and scheduling times for skilled personnel, tools and equipment. Any delay in receiving such critical information can effect timely project completion.

In order to be useful, construction information is generally accessed in the field at a construction site by paper drawings or in some cases, on a laptop computer. However, neither paper drawings nor laptop computers display the information to scale. Viewing information in this manner is often difficult to do and can lead to dangerous and costly mistakes.

Modern construction projects have attempted to remedy many of the inefficiencies caused by lack of timely information delivery and errors in interdependent subtasks by employing a consolidated building information model (BIM). The BIM is a set of computer graphics files that, when viewed on a CAD system, provide the current displays of wire frame models of structures in the completed construction project. The BIM also usually includes locator points on surfaces in the model which serve as identification points for the placement of equipment to be installed in the building such as transformers or generators or for post construction modification such as through holes, ducting installation and conduit installation. The CAD display is layered in a manner that allows all separate views and accurate representations of all structures, physical equipment, wiring and plumbing. While the BIM has helped coordination of tasks and schedules, it is still not completely satisfactory because it is not easily accessible in the field. Further, the BIM does not address schedules or query times.

The prior art has attempted solutions to solve some of these problems with limited success. For example, U.S. Publication No. 2014/0184643 to Friend discloses a system and method of dynamically coordinating machines and personnel about a physical worksite using augmented content on an operator display device. To receive the augmented content, which is generated by an off-board management system, the operator display device is associated with a transmitter/receiver attached to a machine, such as an excavator or bulldozer. A position of the machine or personnel is determined by a GPS system or a laser scanning system. The operator display device includes a visor or goggles with transparent lenses, a scaled-down controller that includes a processor or other electronics to communicate with a personnel transmitter/receiver carried by a person and a controller that processes information signals received from the off-board management system and project them on the lenses of the operator display device. The augmented content is projected in the person's field of view as an overlay superimposed on the surrounding environment to show restricted area for personnel, routes of travel for machinery, and areas designated for excavation. However, the operator display device of Friend cannot determine its position without a construction site. Further, it does not display or interact with a BIM model.

U.S. Publication No. 2014/0210856 to Finn, et al. discloses a system and method that integrates augmented reality technology with land surveying. A 3D digital model of internal elements of a building is generated using a 3D laser scanner upon installation of the internal elements, such as electrical and plumbing before wall panels are installed. The 3D digital model is associated with a set of markers that are placed on a finished wall in the building. The markers are used to project the generated 3D model on a mobile device, such as a smartphone, in view of a user. However, the system in Finn requires the 3D model to be generated once the internal systems are already installed, sometimes incorrectly, just prior to installing wall paneling. Therefore, the system in Finn cannot be used to prevent incorrect installation of building elements leading to costly construction overruns.

U.S. Publication No. 2014/0268064 to Kahle, et al. discloses a system and method for projecting an image on a surface in a building under construction. The system includes a projector mounted on a moveable support for supporting a worker at a work position in the building. The projector projects the image on a surface above the moveable support in response to an image signal defining the image to be projected. The projected image indicates the location of connectors, anchors, and holes to be affixed to, or cut through, the surface and features behind the surface. A positioning system for determining the two dimensional position of the projector includes a laser measuring system that projects a rotating beam of laser light that sweeps across the moveable support to determine the distance and heading of the moveable support. However, the system in Kahle is prone to error because the laser measuring system is easily misaligned in the construction environment, thereby providing an incorrect position to the projector. Further, the system must be attached to the moveable support and cannot be transported easily between construction sites.

Therefore, there is a need in the art for a portable augmented reality system that provides access to virtual information accurately, in real time, at a construction site to prevent mistakes, thereby increasing the usability of the information and improving safety, time use and cost efficiency.

SUMMARY OF THE INVENTION

A system and method for projecting information including, as an example, segments of a building information model at a construction site includes a network, a system administrator connected to the network, a database connected to the system administrator, a set of registration markers positioned in the construction site, and a set of user devices connected to the network. Each user device includes a hard hat, a set of headsets mounted to the hard hat, a set of display units movably connected to the set of headsets, a set of registration cameras connected to the set of headsets and directed towards the set of registration markers, and a wearable computer connected to the set of headsets and to the network.

The wearable computer is programmed with a set of instructions to carry out the method which includes the steps of receiving the building information model, receiving a position image of the set of registration markers, receiving a set of motion data, determining a position of the user device and an orientation of the user device based on the position image and the set of motion data, rendering the building information model based on the position, the orientation, and the position image as a rendered building information model, and displaying the rendered building information model as a stereoscopic image to the user.

The described embodiments herein disclose significantly more than an abstract idea including technical advancements in the fields of construction management and data processing, and a transformation of data which is directly related to real world objects and situations. The disclosed embodiments enable a computer and integrated optics and dedicated electrical components to operate more efficiently and improve the optical display of the BIM and other information and construction management technology in general.

BRIEF DESCRIPTION OF THE DRAWINGS

In the detailed description presented below, reference is made to the accompanying drawings.

FIG. 27 is preferred source code to obtain sensor readings.

FIG. 28 is a preferred coordinate system.

FIGS. 29A and 29B are preferred source code for a track movement subroutine.

DETAILED DESCRIPTION OF THE INVENTION

It will be appreciated by those skilled in the art that aspects of the present disclosure may be illustrated and described in any of a number of patentable classes or contexts including any new and useful process or machine or any new and useful improvement.

Computer program code for carrying out operations for aspects of the present disclosure may be written in any combination of one or more programming languages, including an object-oriented programming language such as Java, C++, C#, .NET, Objective C, Ruby, Python SQL, or other modern and commercially available programming languages.

Figure 1:
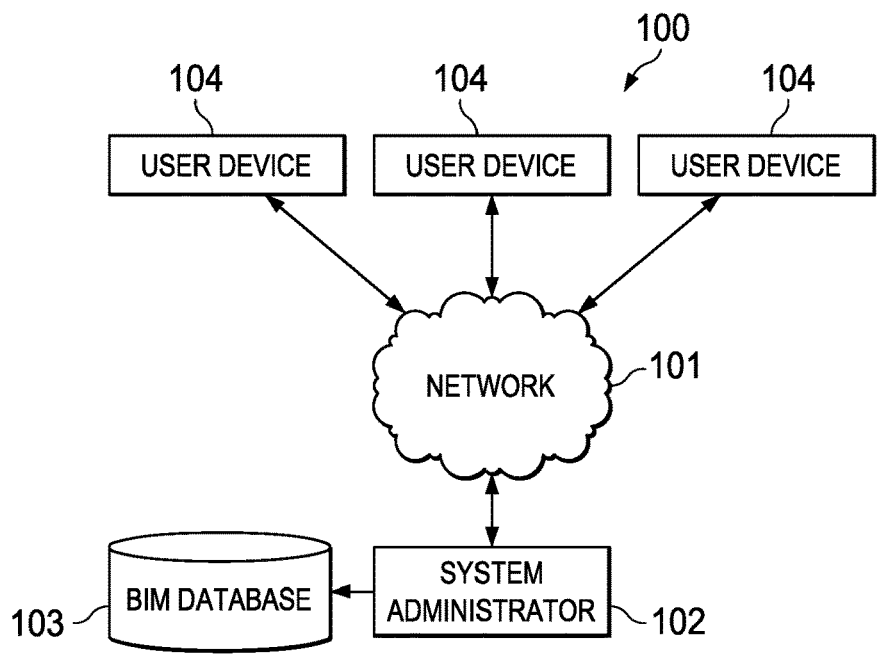
FIG. 1 is a schematic of a BIM distribution system of a preferred embodiment.

Referring to FIG. 1, system 100 includes network 101, system administrator 102 connected to network 101, and a set of user devices 104 each of which is connected to network 101. System administrator 102 is further connected to BIM database 103 for storage of relevant data. For example, receiving data may include a building information model, engineering change orders, textual data, equipment manuals and operation instructions, images, photos, text messages, videos, emails, graphics, documents, 2-dimensional and 3-dimensional drawings, and sketches.

In a preferred embodiment, each of user devices 104 communicates with system administrator 102 to access BIM database 103 to project a BIM as will be further described below.

It will be appreciated by those skilled in the art that any type of three-dimensional rendering may be employed in the disclosed embodiment and that a BIM is just one example of such a three-dimensional rendering.

Figure 2:
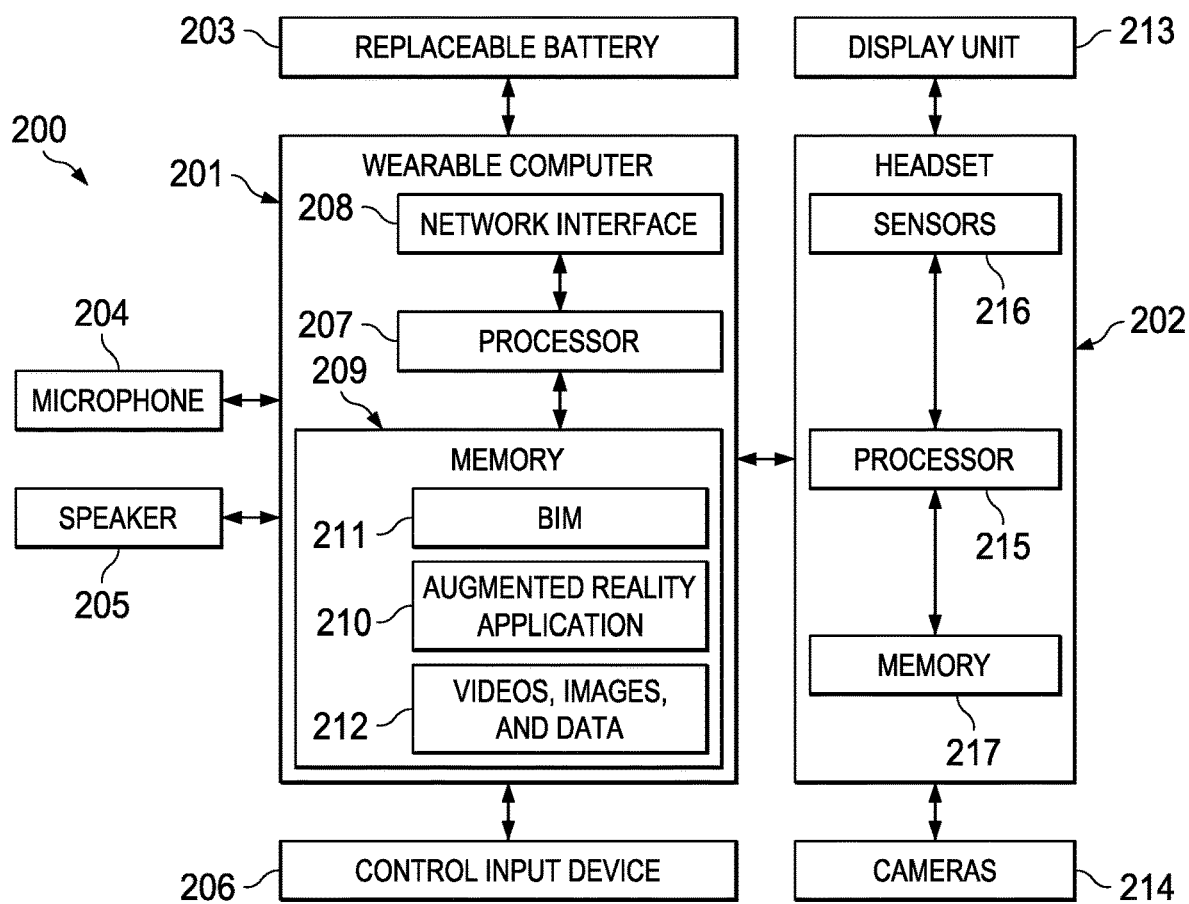
FIG. 2 is a schematic diagram of a user device of a preferred embodiment.

Referring to FIG. 2, user device 200 includes wearable computer 201 connected to headset 202. Wearable computer 201 is further connected to replaceable battery 203, microphone 204, control input device 206, and speaker 205.

Wearable computer 201 includes processor 207 and memory 209 connected to processor 207, and network interface 208 connected to processor 207. Augmented reality application 210, BIM 211, and a set of videos, images, and data 212 are stored in memory 209. In one embodiment, control input device 206 is connected to wearable computer 201. In preferred embodiment control input device 206, is a remote control having a navigation pad and a selection button. Any type of control input device known in the art may be employed.

Headset 202 is further connected to display unit 213 and a set of cameras 214. Headset 202 includes processor 215, a set of sensors 216 connected to processor 215, and memory 217 connected to processor 215.

Figure 3A:
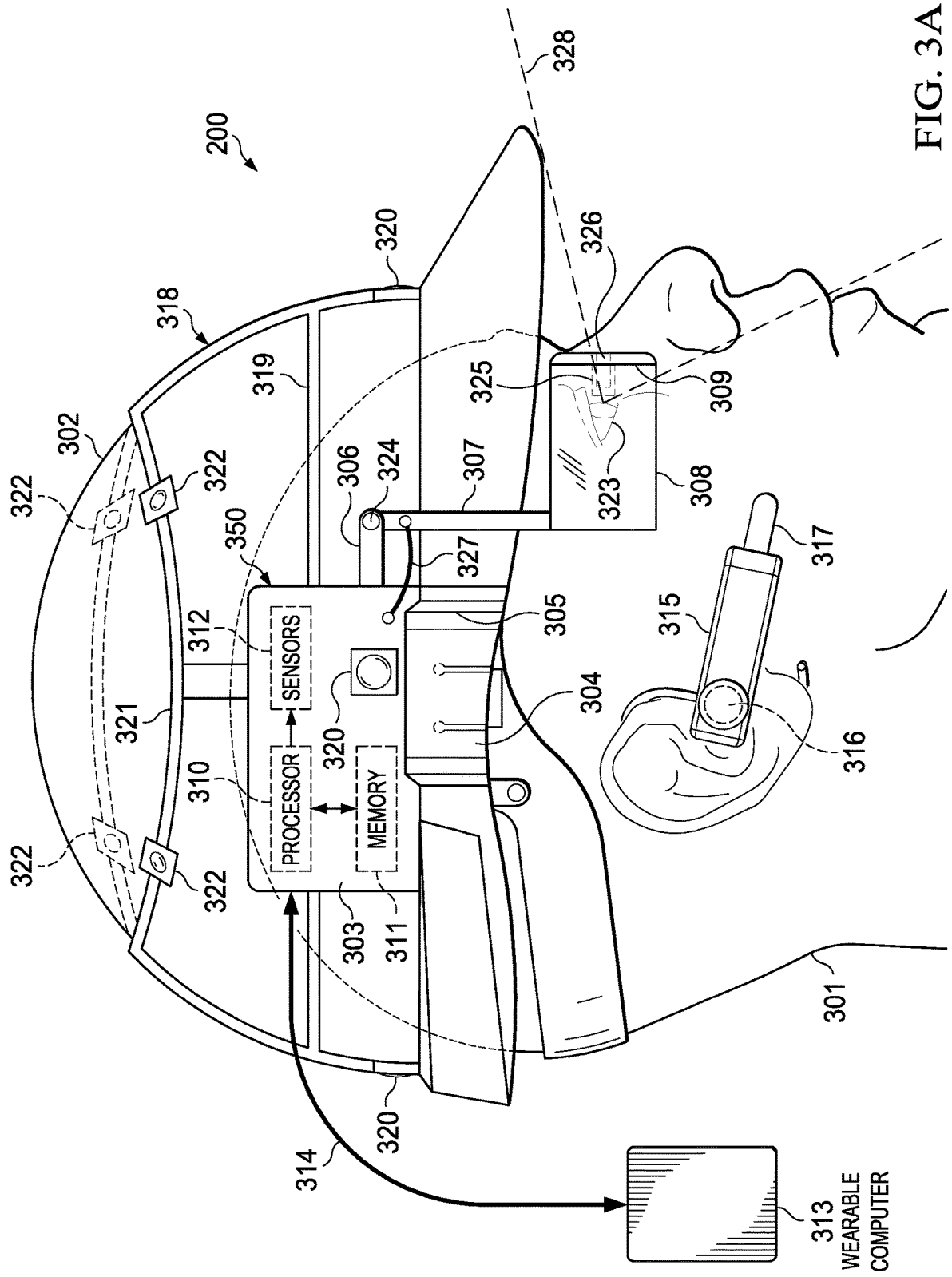
FIG. 3A is a side view of a user device of a preferred embodiment.

Referring to FIG. 3A, a preferred implementation of user device 200 is described. Hard hat 302 is worn by user 301. Hard hat 302 has pocket 305 integrally formed in it. In a preferred embodiment, the hard hat includes a "pocket and clip" arrangement used to secure the headset as shown and described in U.S. Pat. No. 8,191,292 to Cummings, et al., which is incorporated herein by reference. Various types of head covers or helmets may be employed to support the headset. Headset 303 detachably mounts to hard hat 302 by flexible mounts 304 attached to case 350 and pocket 305. Headset 303 is further connected to wearable computer 313 via connection 314. Wearable computer 313 is preferably a portable computing device, such as a laptop or tablet computer, worn as a backpack by user 301. Connection 314 provides a data and power connection from wearable computer 313 to headset 303. Headset 303 includes processor 310, memory 311 connected to processor 310, and sensors 312 connected to processor 310. Mounting arm 306 is slidably inserted into headset 303 to allow forward and backward movement. In a preferred embodiment, the mounting arm is biased by a mechanical coil spring which enables it to retract into case 350. Display arm 307 is pivotably connected to mounting arm 306 for pivotal movement about axis 324. Display unit 308 is attached to display arm 307. Display unit 308 includes projector 325, camera 326, and display light guide 309. Camera 326 has field of view 328. In a preferred embodiment, field of view 328 is 90°. In other embodiments, other suitable field of view ranges may be employed. Display arm 307 is further connected to headset 303 with data and power connection 327.

User 301 wears communication device 315. Communication device 315 includes earpiece speaker 316 and microphone 317. Communication device 315 is preferably connected to wearable computer 313 via a wireless connection such as a Bluetooth connection. In other embodiments, other wireless or wired connections are employed. Communication device 315 enables voice activation and voice control of an augmented reality application stored in the wearable computer 313 by user 301.

In one embodiment, camera matrix 318 is detachably connected to headset 303. Camera matrix 318 includes halo 319 and halo 321, each of which is detachably connected to headset 303. A set of base cameras 320 is connected to halo 319 and in communication with headset 303. A set of angled cameras 322 is connected to halo 321 and in communication with headset 303.

Figure 3B:
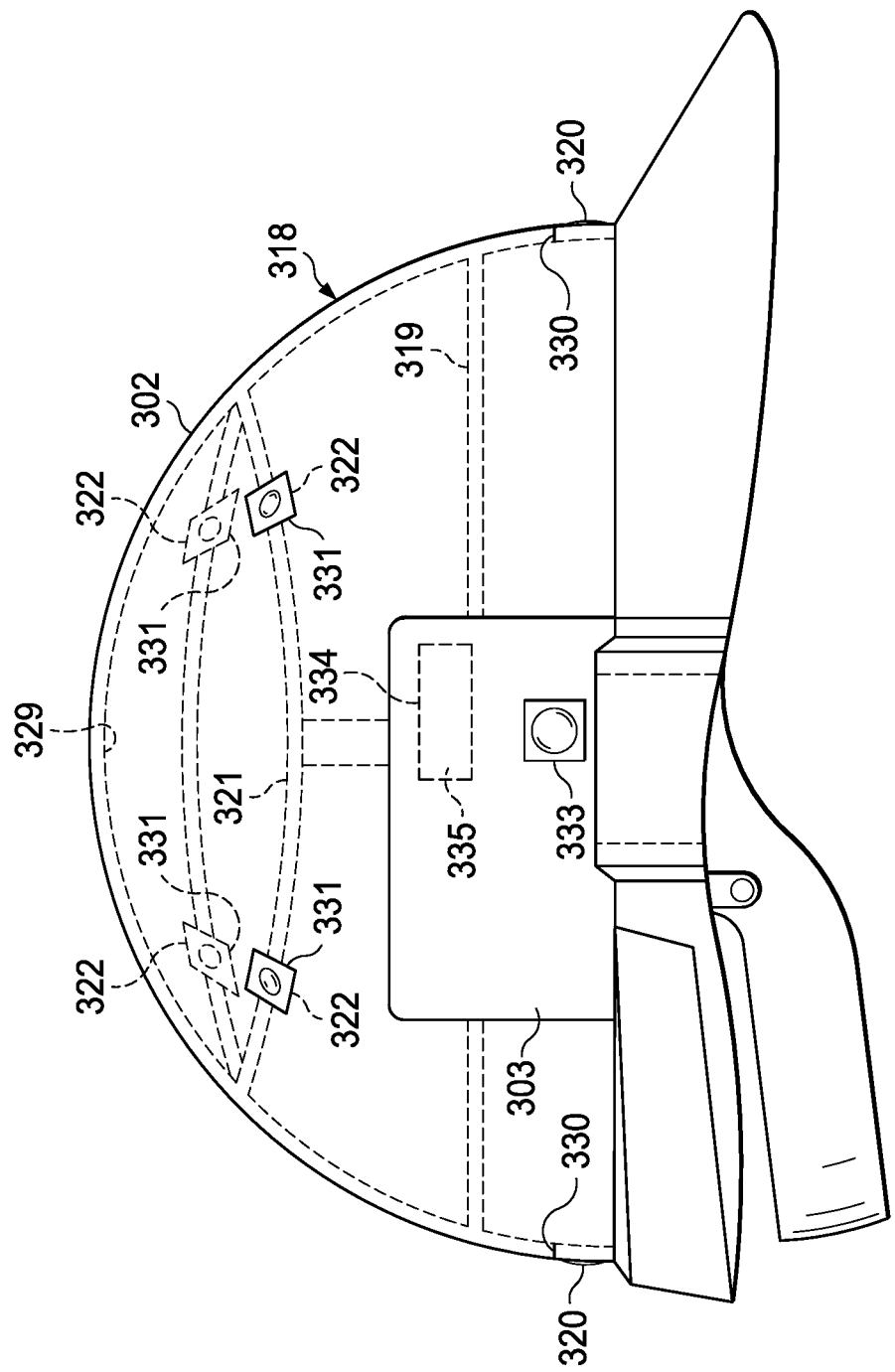
FIG. 3B is a side view of a camera matrix of a preferred embodiment.

Referring to FIG. 3B in another embodiment, camera matrix 318 is attached inside surface 329 of hard hat 302. In this embodiment, halos 319 and 321 are attached to inside surface 329 of hard hat 302 with a suitable adhesive or fastener. Hole 334 is integrally formed in hard hat 302 adjacent to headset 303 for connection to camera matrix 318. In a preferred embodiment, connector 335 is a USB 3.0 connector, connected to a processor of headset 303 and positioned in hole 334 to connect to camera matrix 318. Other suitable data connections may be employed. Set of base cameras 320 is connected to halo 319, each of which is positioned in a hole of set of holes 330. Set of holes 330 is integrally formed in hard hat 302. In one embodiment, side cameras 333 of set of base cameras 320 are attached to headset 303 outside of hard hat 302. In another embodiment, side cameras 333 are eliminated. Set of angled cameras 322 is connected to halo 321, each of which is positioned in a hole of set of holes 331. Set of holes 331 is integrally formed in hard hat 302.

In another preferred embodiment, the cameras are each mounted securely to the inside surface of the hard hat and are positioned to view the outside world through the holes.

In a preferred embodiment, a BIM is downloaded from a system administrator server into a memory resident in a wearable computer 313. The BIM is transmitted from wearable computer 313 through headset 303 and projector 325 for viewing adjacent eye 323 of user 301 to augment the vision of user 301, as will be further described below. The user can select different layers of the BIM to view via voice control. For example, the BIM includes an electrical layer, which shows the location of electrical conduit, connection points, and equipment. As the user moves, headset 303 and wearable computer 313 tracks the location of user 301 and the position and orientation of the user's head using camera 326 and/or camera matrix 318.

In one embodiment, a set of data is downloaded, selected, and displayed to user 301. In one embodiment, the position and orientation of the user's head is not tracked in a display mode. Rather, the data is displayed without regard to the position of the user or hard hat. Any type of data content may be selected, formatted, scaled and displayed, including images, photos, text messages, videos, emails, graphics, documents, drawings, and sketches.

In a preferred embodiment, processor 310 is a 2.8 GHz octa-core Snapdragon 810 processor available from QUAL-COMM® Technologies, Inc. Other suitable processors known in the art may be employed.

In a preferred embodiment, sensors 312 is a 9-axis motion tracking system-in-package package sensor, model no. MP11-9150 available from InverSense®, Inc. In this embodiment, the 9-axis sensor combines a 3-axis gyroscope, a 3-axis accelerometer, an on-board digital motion processor, and a 3-axis digital compass. In other embodiments, other suitable sensors and/or suitable combinations of sensors may be employed.

In a preferred embodiment, memory 311 is a 2 GB LPDDR3 RAM. Other suitable memory known in the art may be employed.

In a preferred embodiment, each of base cameras 320 and angled cameras 322 is a 16 megapixel smartphone camera capable of recording video at 30 fps that includes a CMOS image sensor, part no. 5K3M2 available from Samsung Semiconductor. Other suitable cameras and/or image sensors known in the art may be employed.

Figure 4A:
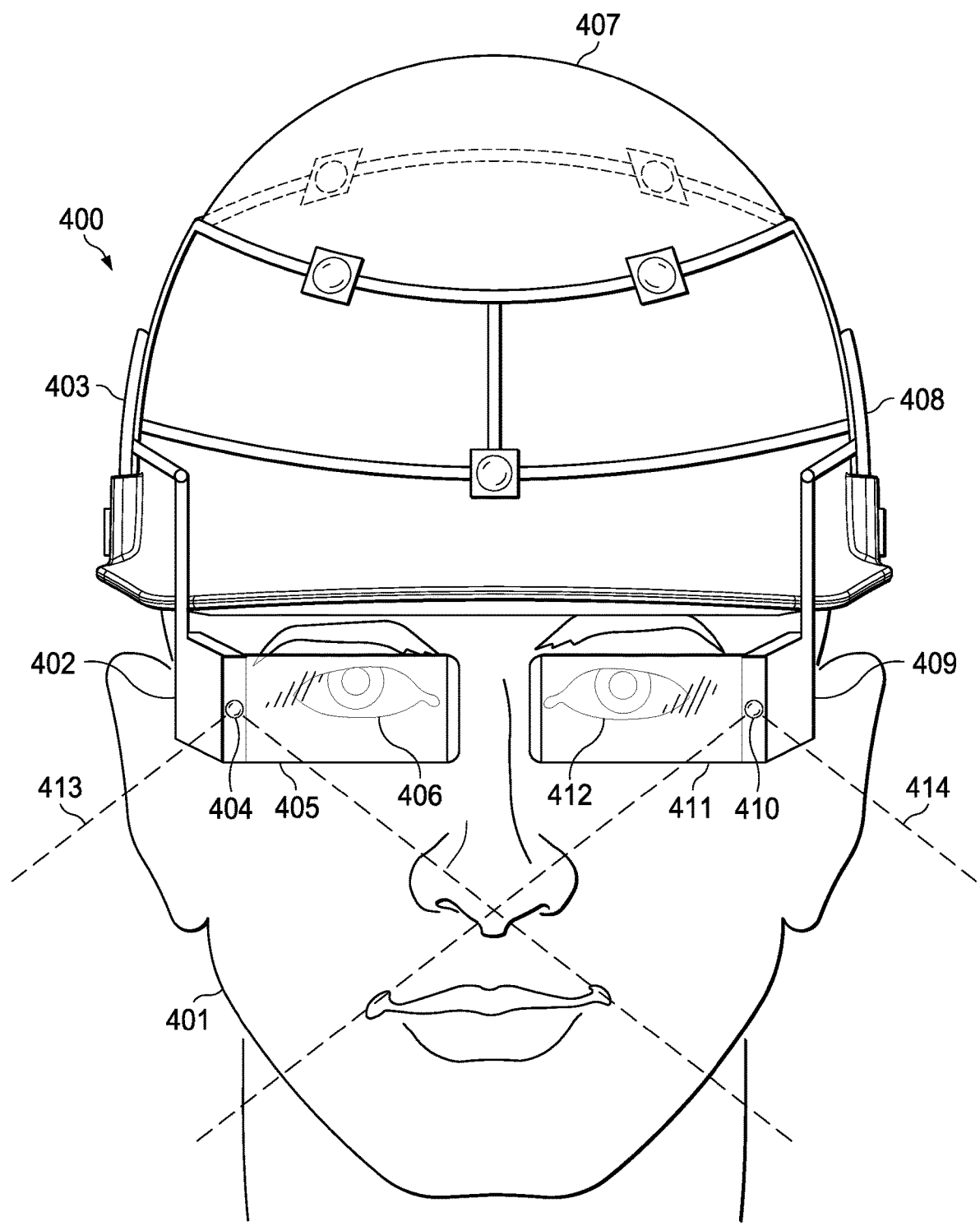
FIG. 4A is a front view of a user device of a preferred embodiment.

Referring to FIG. 4A, user device 400 includes display unit 402 which includes camera 404 on the temporal side of eye 406 of user 401 and display light guide 405. Camera 404 has field of view 413. Display light guide 405 is positioned in the field of view and adjacent to eye 406. Display unit 402 is movably connected to headset 403, which is detachably mounted to hard hat 407. Display unit 409 is movably connected to headset 408, which is detachably mounted to hard hat 407. Display unit 409 includes camera 410 on the temporal side of eye 412 of user 401. Camera 410 has field of view 414. Display light guide 411 is in the field of view and adjacent to eye 412. Display units 402 and 409 and headsets 403 and 408 are the same as previously described. Display units 402 and 409 provide a stereoscopic augmented view to user 401.

In a preferred embodiment, each of cameras 404 and 410 is a 16 megapixel smartphone camera capable of recording video at 30 fps that includes a CMOS image sensor, Part No. 5K3M2 available from Samsung Semiconductor. Other suitable cameras and/or image sensors known in the art may be employed.

Figure 4B:
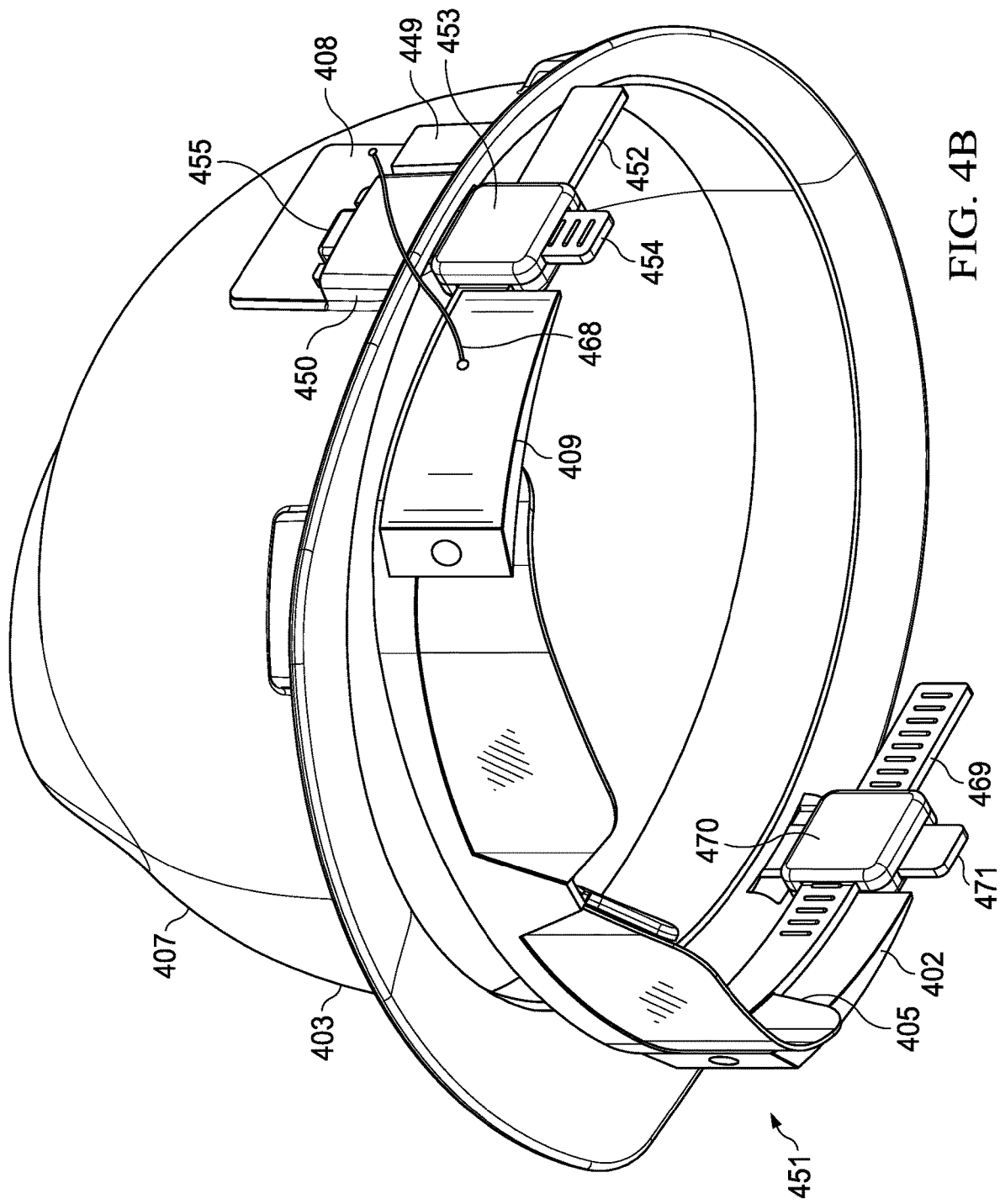
FIG. 4B is an isometric view of a user device of a preferred embodiment.
Figure 4C:
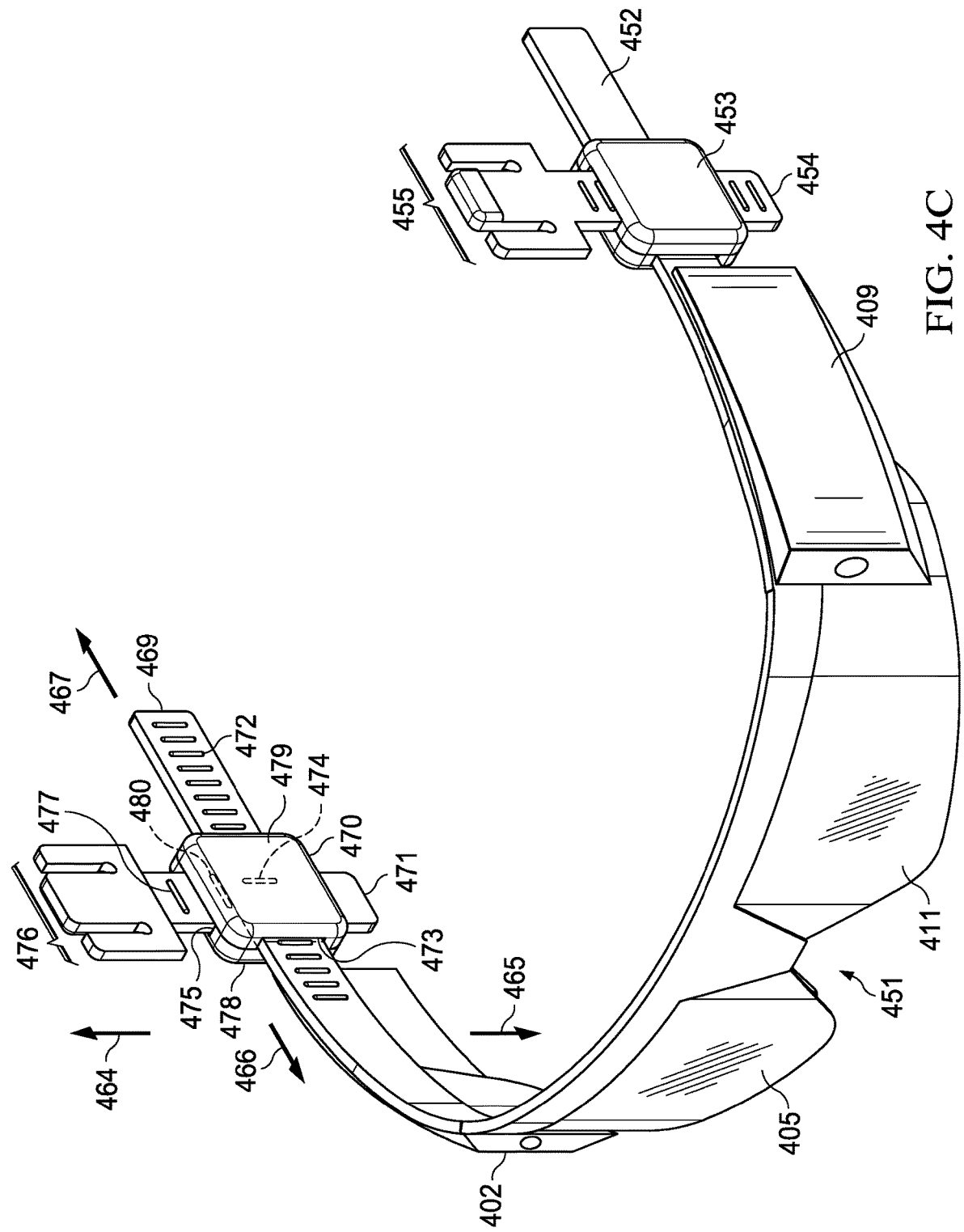
FIG. 4C is an isometric view of a display unit of a preferred embodiment.
Figure 4D:
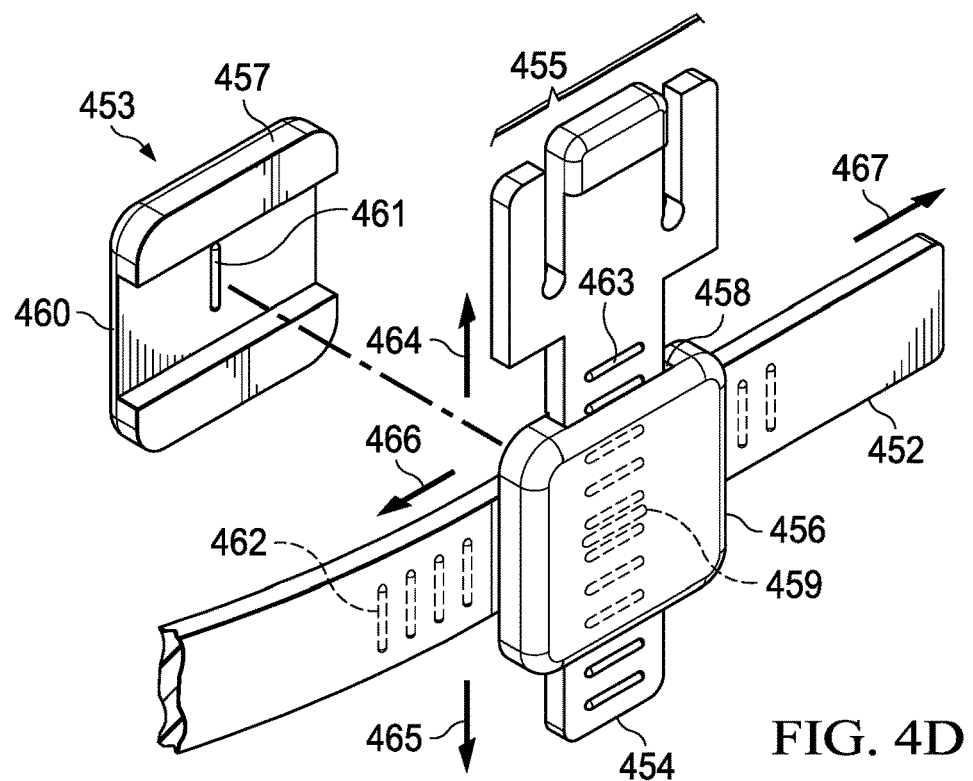
FIG. 4D is an exploded isometric view of a connection for a display unit of a preferred embodiment.

Referring to FIGS. 4B, 4C, and 4D in one embodiment, hard hat 407 includes pocket 450 integrally formed in hard hat 407 and adjacent to pocket 449. Glasses 451 includes display arm 452 adjustably engaged with connector 453 and display arm 469 adjustably engaged with connector 470. Mounting arm 454 is adjustably engaged with connector 453. Mounting arm 471 is adjustably engaged with connector 470. Data connection 468 connects display unit 409 to headset 408 detachably mounted to pocket 449, as previously described. Display arm 452 includes a set of ridges 462 integrally formed on it. Mounting arm 454 includes flexible mounts 455 to detachably mount glasses 451 to hard hat 407. Mounting arm 454 further includes a set of ridges 463 integrally formed on it. Connector 453 has mount portion 456 and display portion 457. Mount portion 456 includes channel 458 integrally formed in it. Channel 458 has ridge 459 integrally formed on it. Mounting arm 454 slidingly engages with channel 458. Set of ridges 463 engages with ridge 459 to enable adjustable positional movement along directions 464 and 465. Display portion 457 includes channel 460 integrally formed in it. Channel 460 includes ridge 461 integrally formed on it. Display arm 452 slidingly engages with channel 460. Set of ridges 462 engages with ridge 461 to enable adjustable positional movement along directions 466 and 467.

Likewise, display arm 469 includes a set of ridges 472 integrally formed on it. Mounting arm 471 includes flexible mounts 476 to detachably mount glasses 451 to a pocket in hard hat 407. Mounting arm 471 further includes a set of ridges 477 integrally formed on it. Connector 470 has mount portion 478 and display portion 479. Mount portion 478 includes channel 475 integrally formed in it. Channel 475 has ridge 480 integrally formed on it. Mounting arm 471 slidingly engages with channel 475. Set of ridges 477 engages with ridge 480 to enable adjustable positional movement along directions 464 and 465. Display portion 479 includes channel 473 integrally formed in it. Channel 473 includes ridge 474 integrally formed on it. Display arm 469 slidingly engages with channel 473. Set of ridges 472 engages with ridge 474 to enable adjustable positional movement along directions 466 and 467. Glasses 451 includes display light guides 405 and 411 and display units 402 and 409, as previously described. Display unit 402 is connected to headset 403 with a data connection.

In a preferred embodiment, channel 458 is generally perpendicular to channel 460 and vice versa. Other arrangements may be employed.

In a preferred embodiment, channel 475 is generally perpendicular to channel 473 and vice versa. Other arrangements may be employed.

In a preferred embodiment, each of display arms 452 and 469, connectors 453 and 470, and mounting arms 454 and 471 is made of an injection molded plastic. Other suitable materials known in the art may be employed.

In one embodiment, mount portion 456 and display portion 457 are separate pieces attached to each other with a suitable adhesive or epoxy. In another embodiment, mount portion 456 and display portion 457 are integrally formed portions of a single piece adjacent to each other. Other attachment means known in the art may be employed.

In one embodiment, mount portion 478 and display portion 479 are separate pieces attached to each other with a suitable adhesive or epoxy. In another embodiment, mount portion 478 and display portion 479 are integrally formed portions of a single piece adjacent to each other. Other attachment means known in the art may be employed.

Figure 5:
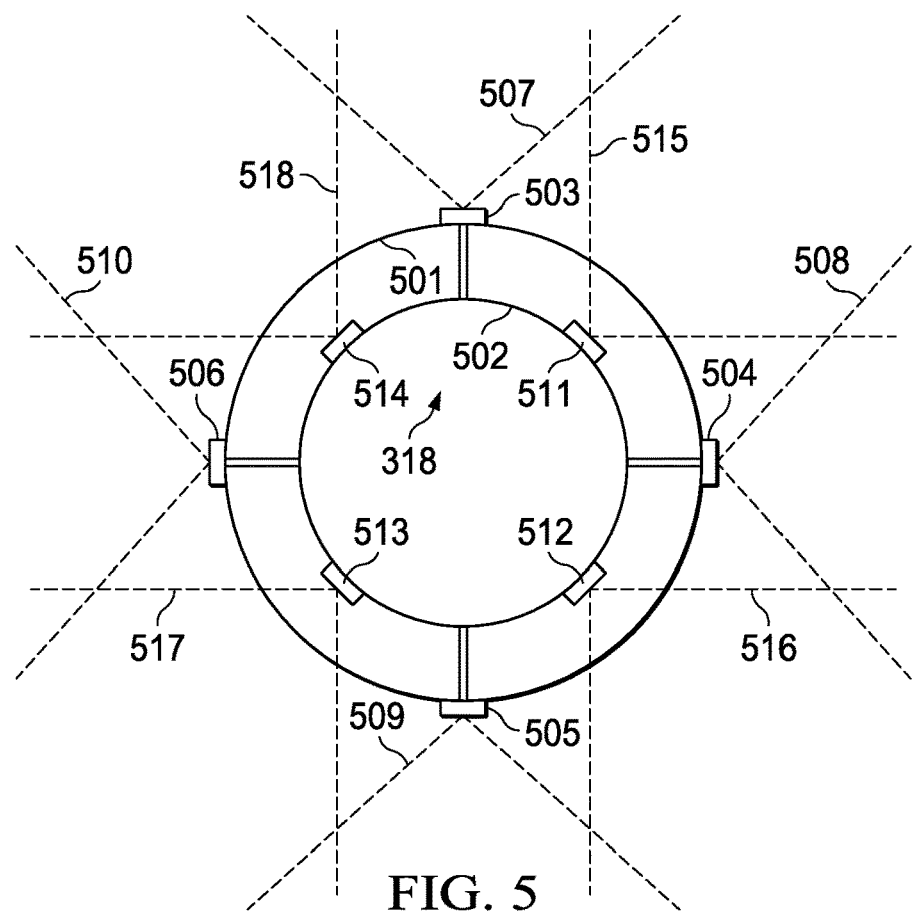
FIG. 5 is a top view of a camera matrix of a preferred embodiment.

Referring to FIG. 5, camera matrix 318 will be further described. Camera matrix 318 includes halo 501 and halo 502 connected to halo 501. Each of cameras 503, 504, 505, and 506 is connected to halo 501. Camera 503 has field of view 507. Camera 504 has field of view 508. Camera 505 has field of view 509. Camera 506 has field of view 510. Each of cameras 511, 512, 513, and 514 is connected to halo 502. Camera 511 has field of view 515. Camera 512 has field of view 516. Camera 513 has field of view 517. Camera 514 has field of view 518.

In a preferred embodiment, each of cameras 503, 504, 505, and 506 is positioned approximately 90° with respect to each other around halo 501. Other angular intervals may be employed.

In a preferred embodiment, each of cameras 511, 512, 513, and 514 is positioned approximately 90° with respect to each other around halo 502. Other angular intervals may be employed.

In a preferred embodiment, each of field of views 507, 508, 509, and 510 is approximately 90°. Other field of view ranges may be employed.

In a preferred embodiment, each of field of views 515, 516, 517, and 518 is approximately 90°. Other field of view ranges may be employed.

In a preferred embodiment, camera matrix 318 provides a 360° view of the surroundings of a user. In other embodiments, other numbers of cameras, angular positions, and field of view ranges may be employed to provide a 360° view.

tioned at angles $\omega$ and $\gamma$, respectively from front surface 613 to provide total internal reflection ("TIR") for light guide 601, thereby projecting an image in field of view 610 of user eye 609.

In a preferred embodiment, angles $\omega$ and $\gamma$, are 30° and 45°, respectively. Any angles may be employed to provide TIR for light guide 601.

In use, light source 605 displays an image received from headset 615. The image is represented by rays 611 and 612. Rays 611 and 612 are transmitted through collimating lens 606 and reflected off of input surface 607 for TIR. Rays 611 and 612 are further reflected off of front surface 613 and rear surface 614 and output surface 608 in field of view 610 of user eye 609.

In a preferred embodiment, light source 605 is an organic light emitting diode ("OLED") display such as the WUXGA OLED-XL Microdisplay, part no. EMA-100801-01, available from eMagin Corporation. In another embodiment, light source 605 is a light emitting diode ("LED") display. Other suitable light sources and displays known in the art may be employed.

In a preferred embodiment, light guide 601 is made of acrylic. In another embodiment, light guide 601 is made of poly (methyl methacrylate) ("PMMA"). Other suitable materials known in the art may be employed.

In a preferred embodiment, input surface 607 is a flat mirror and output surface 608 is a partially-reflective mirror, such as a half-silvered mirror. In other embodiments, other combinations for input surface 607 and output surface 608 may employed and are summarized in Table 1 below.

TABLE 1

Combinations for Input and Output Surfaces

| Input Surface | Output Surface | | | | |
|---|---|---|---|---|---|
| | Single Reflective Surface | Multiple Reflective Surfaces | Diffraction grating (varying index) | Diffraction Grating (lines) | Holographic Element |
| Single Reflective Surface | x | x | x | x | x |
| Multiple Reflective Surfaces | x | x | x | x | x |
| Combination Refractive/Reflective Element | x | x | x | x | x |
| Diffraction Grating (varying index) | x | x | x | x | x |
| Diffraction Grating (lines) | x | x | x | x | x |
| Holographic Element | x | x | x | x | x |

Figure 6:
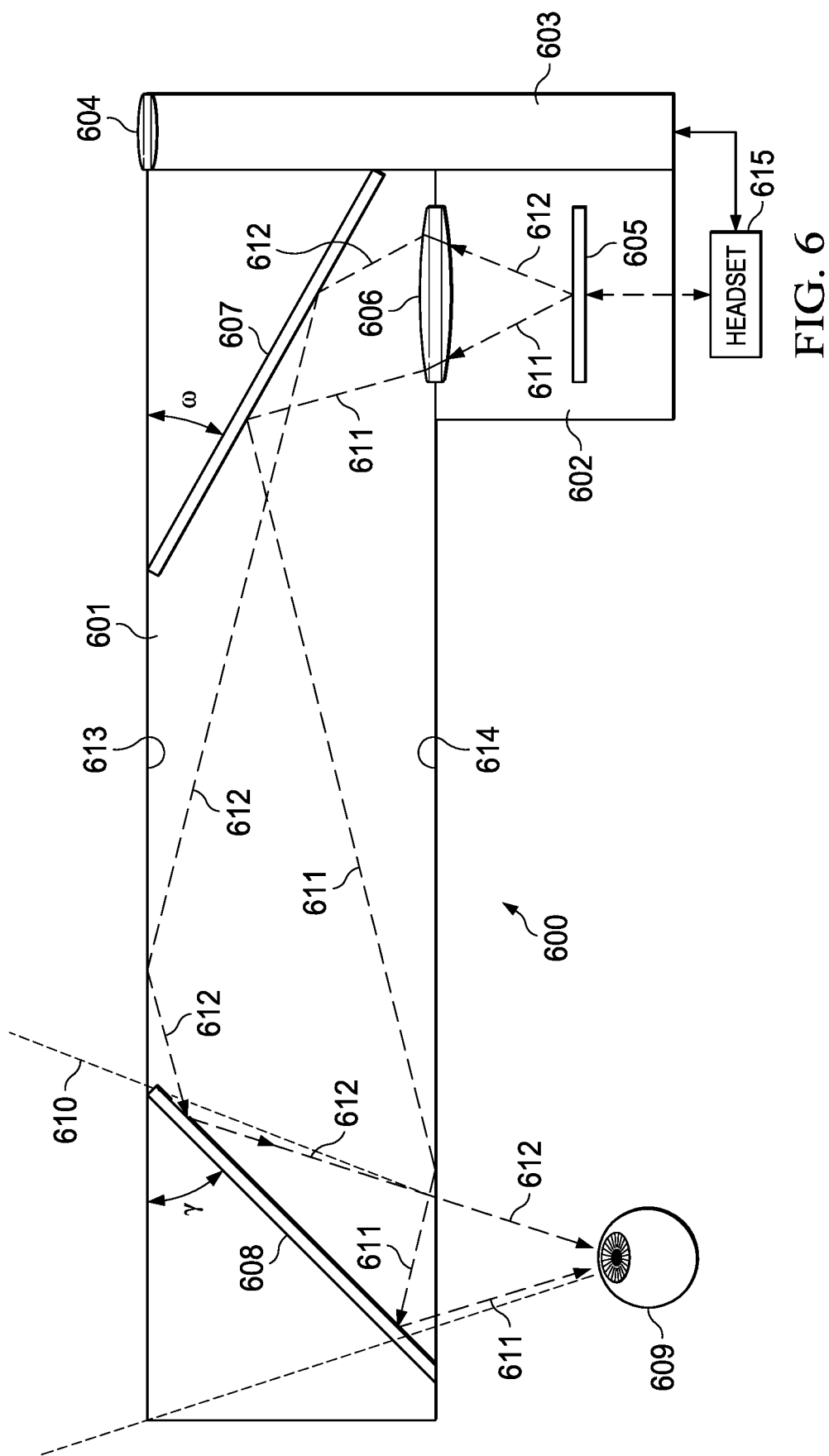
FIG. 6 is a top view schematic of a projector unit and ray diagram of a preferred embodiment.
Figure 7A:
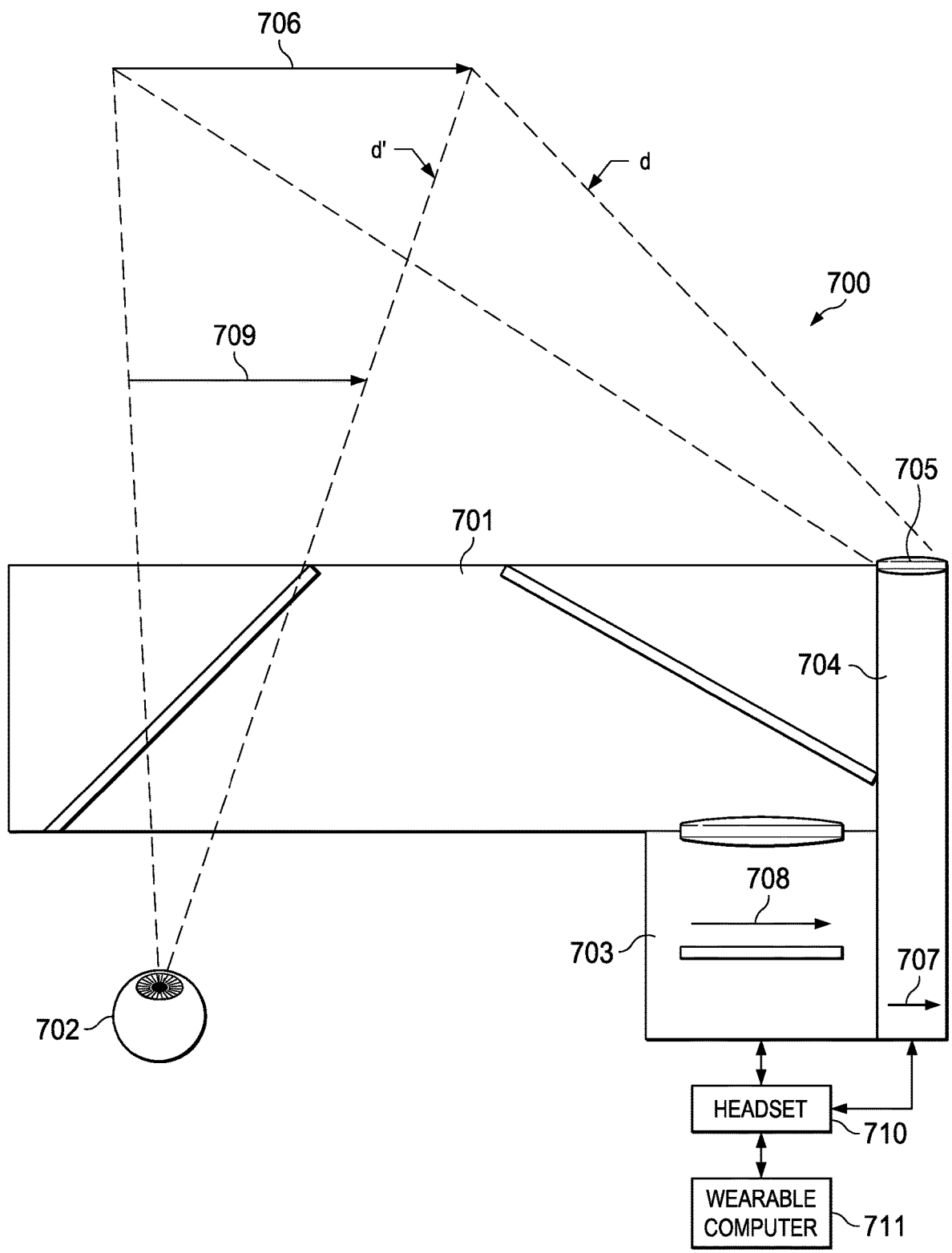
FIG. 7A is a top view schematic of a projector unit and a virtual image of a preferred embodiment.

Referring to FIG. 6, each of display units 402 and 409 will be further described as display unit 600. Display unit 600 will be further described with respect to a right eye of a user. It will be appreciated by those skilled in the art that the arrangement of display unit 600 is simply reversed for implementation on a left eye. Display unit 600 includes light guide 601, projector 602 attached to light guide 601, and camera 603 connected to and adjacent to light guide 601 and projector 602. Camera 603 is connected to headset 615 and includes lens 604. Projector 602 includes light source 605. Light source 605 is connected to headset 615. Collimating lens 606 is positioned adjacent to light source 605. Light guide 601 includes input surface 607 and output surface 608, each of which is attached to the interior of light guide 601. Each of input surface 607 and output surface 608 is posi- Referring to FIG. 7A in use, lens 705 of camera 704 is automatically focused on real object 706 at a distance d from camera 704 and sent to headset 710 as image 707. Headset 710 and wearable computer 711 determine distance d and the position of display unit 700 with respect to real object 706. Wearable computer 711 generates virtual image 708 based on distance d. Projector 703 projects virtual image 708 into light guide 701, as previously described. Virtual image 708 is displayed as virtual object 709 to appear at distance d in view of user eye 702. Virtual object 709 is magnified to coincide with the size and position of real object 706 to create a perceived depth of focus d. In one embodiment, d is less than d. In another embodiment, d is equal to d. In one embodiment, d is a fixed distance from camera 704 for all real objects.

Figure 7B:
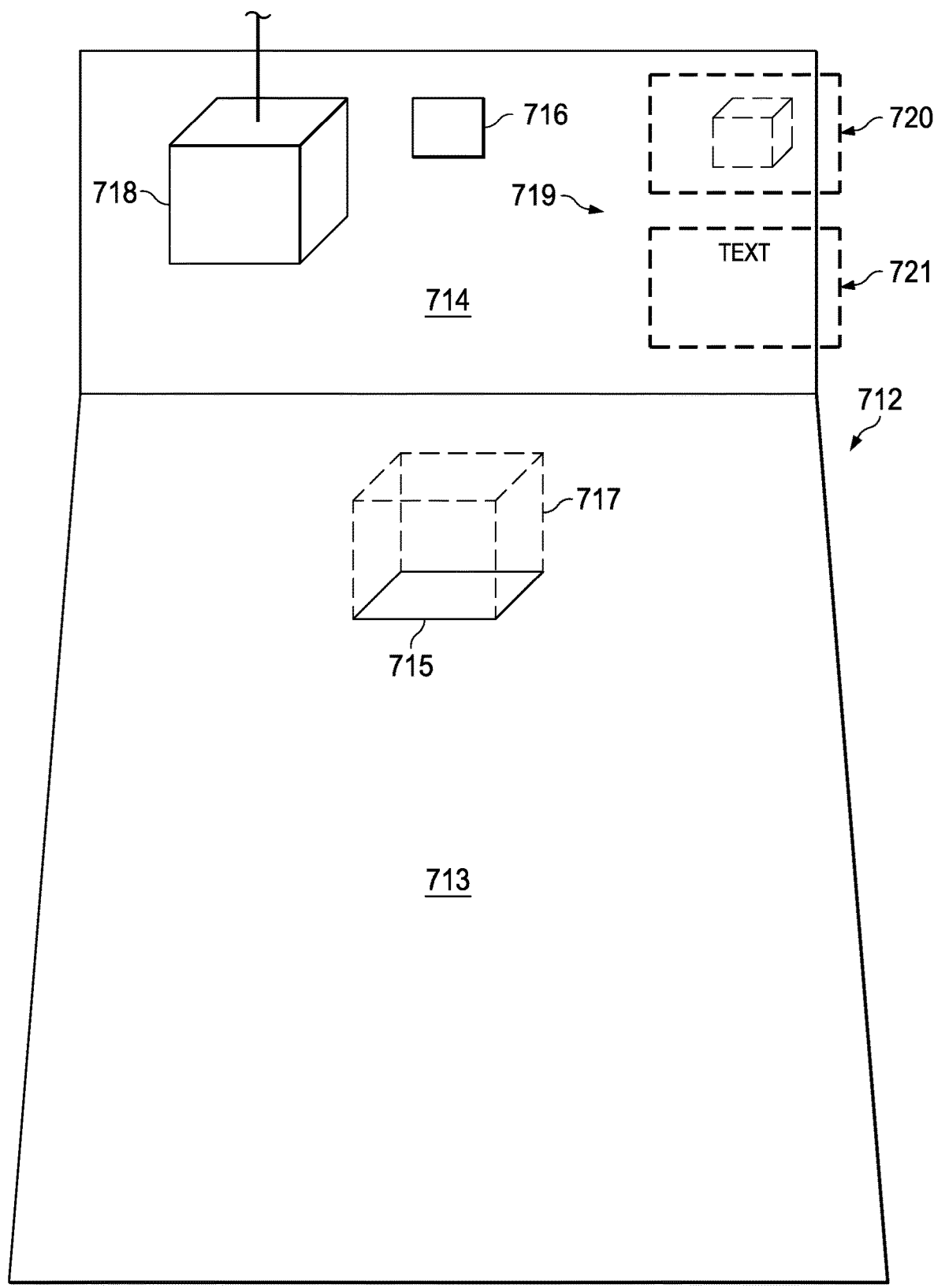
FIG. 7B is a point of view of an augmented image of a preferred embodiment.

Referring to FIG. 7B, point of view 712 is the view a user sees while wearing a headset and display unit. Point of view 712 includes floor 713 and adjoining wall 714. Registration marker 715 is attached to floor 713. Registration marker 716 is attached to wall 714. Real object 718 is being lowered into position. According to the BIM, the correct location for real object 718 is outlined by virtual object 717. In this way, a user easily determines if real object 718 is properly positioned and can quickly make adjustments to ensure real object 718 is properly positioned.

In one embodiment, a set of data 719 is displayed. The set of data 719 includes image 720 and text 721. Any type of data including images, photos, text messages, videos, emails, graphics, documents, drawings, schematics, diagrams, and hand-drawn sketches may be employed. For example, image 720 is an installation diagram of real object 718 and text 721 is a set of installation instructions for real object 718.

Each of the positions and sizes of image 720 and text 721 is optionally changed by the user.

In one embodiment, set of data 719 is displayed simultaneously with virtual object 717. In another embodiment, set of data 719 is displayed without virtual object 717 in a display mode, as will be further described below.

Figure 8:
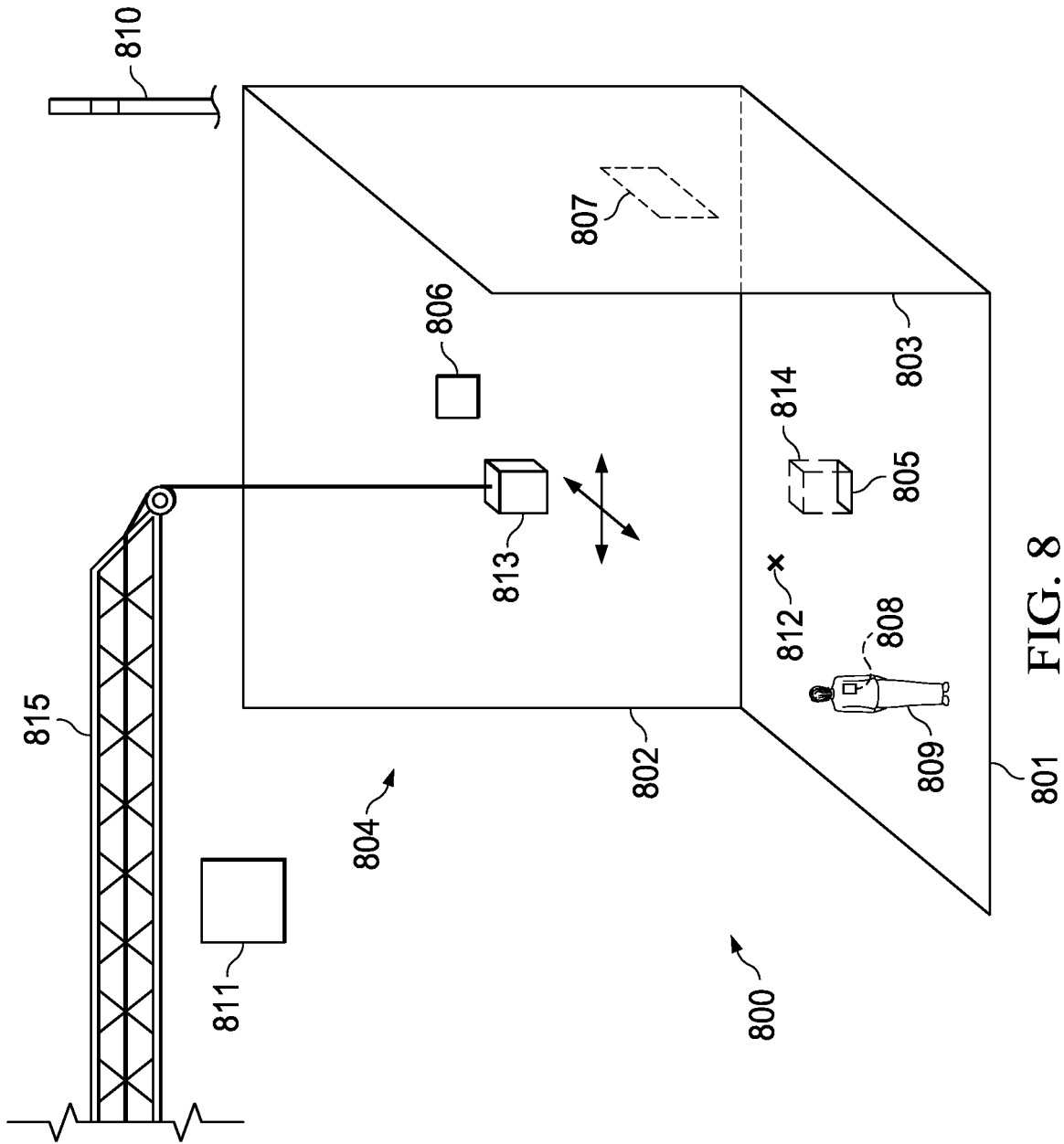
FIG. 8 is a plan view of a user device and a registration system of a preferred embodiment.

Referring to FIG. 8, construction site 800 includes floor 801 and adjoining walls 802 and 803. Registration system 804 includes registration markers 805, 806, and 807 positioned at precise locations on floor 801, wall 802 and wall 803, respectively and serve as a set of reference points for user device 808 worn by user 809.

Each of the positions of registration markers 805, 806, and 807 is associated with a position in a BIM. Survey location 810 is precisely positioned at a known location at construction site 800 and saved in the BIM. Registration marker 811 is a master reference point based on the location of the survey location 810. Each of registration markers 805, 806, and 807 is positioned from registration marker 811 to ensure proper location of floor 801 and walls 802 and 803. At least one of registration markers 805, 806, 807, and 811 will be in view of a camera of user device 808 worn by user 809 and at any given time. The camera captures an image of at least one of registration markers 805, 806, 807, and 811. A wearable computer of user device 808 decodes the captured image to determine a real location of at least one of registration markers 805, 806, 807, and 811. The wearable computer determines a corresponding virtual location in the BIM.

For example, user 809 is standing in construction site 800 wearing user device 808 and looking down at location 812 where object 813 is to be installed. Registration marker 805 is in view of user device 808. The projected BIM shows the correct installation position 814 in view of user 809 as if the user were standing inside the BIM. As user 809 tilts his or her head up to look at wall 802 the movement of the user's head is detected by user device 808 and registration marker 806 is in view of user device 808. Based on the position of registration marker 806, the BIM is moved and rotated in real time to align with the user's field of vision and provide an in-person view of the BIM to user 809. Crane 815 lowers object 813 towards location 812. Based on the projected BIM, object 813 should be installed at installation position 814. User 809 uses the projected BIM to properly lower the object 813 and precisely install object 813 at correct installation position 814, thereby saving time and money in the form of overrun construction costs.

If a mistake is found, user 809 captures still images using the camera for upload to the system administrator or records or streams video back to the system administrator. In this way, the party responsible for the mistake can be easily and quickly identified.

Figure 9A:
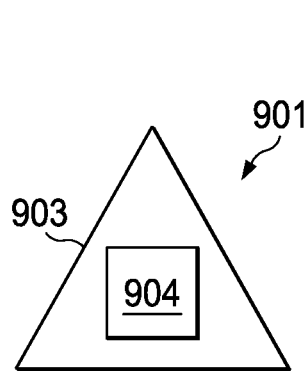
FIG. 9A is a schematic of a registration marker of a preferred embodiment.
Figure 9B:
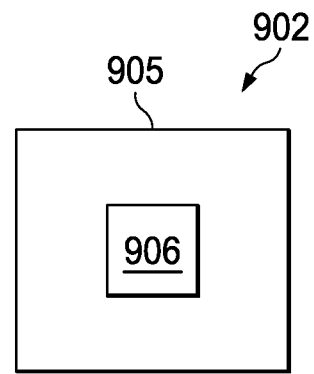
FIG. 9B is a schematic of a registration marker of a preferred embodiment.

Referring to FIGS. 9A and 9B, registration marker 901 includes shape 903 and code 904. Registration marker 902 includes shape 905 and code 906. Any polygon may be employed for shapes 903 and 905.

In a preferred embodiment, each of codes 904 and 906 is a two-dimensional bar code. In this embodiment, each of codes 904 and 906 includes a set of marker information, including a set of dimensions of shapes 903 and 905, and a set of x, y, z coordinates position at which registration markers 901 and 902 are placed, and a description of each shape and location. Any type of code may be employed.

Shapes 903 and 905 enable detection of codes 904 and 906, respectively, at an offset angle. For example, shape 903 is an equilateral triangle and shape 905 is a rectangle. If a camera capturing an image of shapes 903 and 905 is positioned at an offset angle, shapes 903 and 905 will appear as a scalene triangle and a parallelogram, respectively, in a skewed image.

Figure 10:
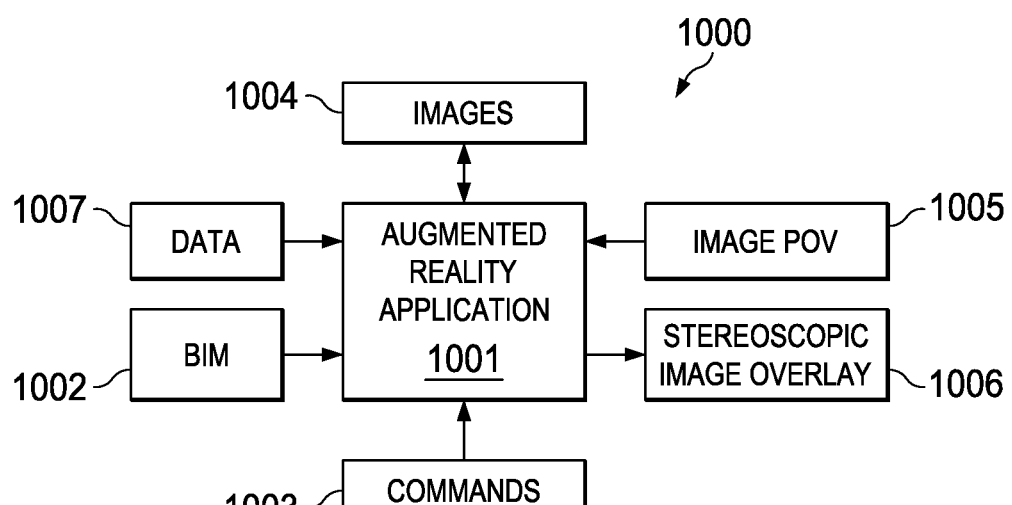
FIG. 10 is a schematic of a data flow for an augmented reality application of a preferred embodiment.

Referring to FIG. 10, data flow 1000 for augmented reality application 1001 for a user device will be described. BIM 1002 is input into augmented reality application 1001. Application commands 1003 provide input control for the processes of augmented reality application 1001. Images 1004 are received and sent by augmented reality application 1001. For example, a set of cameras captures a set of registration images. The set of marker images is used to determine the position of the user. In another example, images 1004 are still or video images captured by a set of cameras adjacent to the eyes of the user and saved to memory for later upload or streamed to a server. Point of view image 1005 is captured by the set of headset cameras adjacent to the eyes of a user. Set of data 1007 is input into augmented reality application 1001.

In a preferred embodiment, the position of the user is determined from the set of code images 1004 by augmented reality application 1001. Augmented reality application 1001 orients BIM 1002 according to the determined position of the user. Commands 1003 determine which layers of BIM 1002 are displayed. Augmented reality application 1001 overlays the selected layers of BIM 1002 at the determined position to generate stereoscopic image overlay 1006 for display.

In one embodiment, commands 1003 determine a subset of set of data 1007 to display and the size and position of the subset of the set of data. Augmented reality application 1001 overlays the selected subset of data 1007 according to the selected size and position of the set of data 1007 for display.

Figure 11:
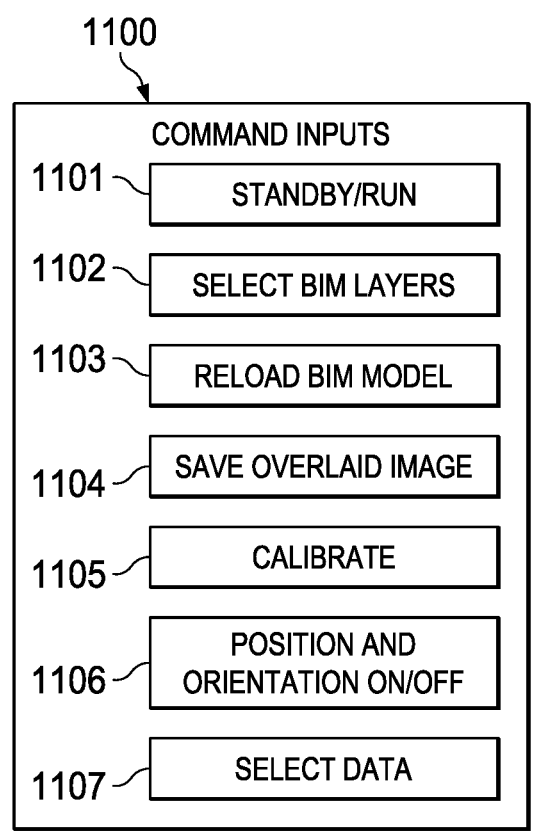
FIG. 11 is a command input menu for a user device of a preferred embodiment.

Referring to FIG. 11, commands menu 1100 includes standby/run toggle 1101, BIM layer selection 1102, reload BIM 1103, save overlaid image 1104, and calibrate 1105. Standby/run toggle 1101 toggles the augmented reality application to a standby mode or a run mode. BIM layer selection 1102 enables the user to select any layer of the BIM to view. For example, the layers include, but are not limited to, structural, electrical, plumbing, data, and HVAC. Reload BIM 1103 downloads the BIM into memory. Save overlaid image 1104 captures a "screen capture" of the point of view and the overlaid BIM from the perspective of the user. Calibrate 1105 executes a calibration process, as will be further described below. Position and orientation toggle 1106 toggles the position and orientation functions on and off to selectively run in a display mode. Select data 1107 enables the user to select which data to display and the size and the position of the selected data. Selection of 1101, 1102, 1103, 1104, 1105, 1106, and 1107 is accomplished via voice controls.

Figure 12:
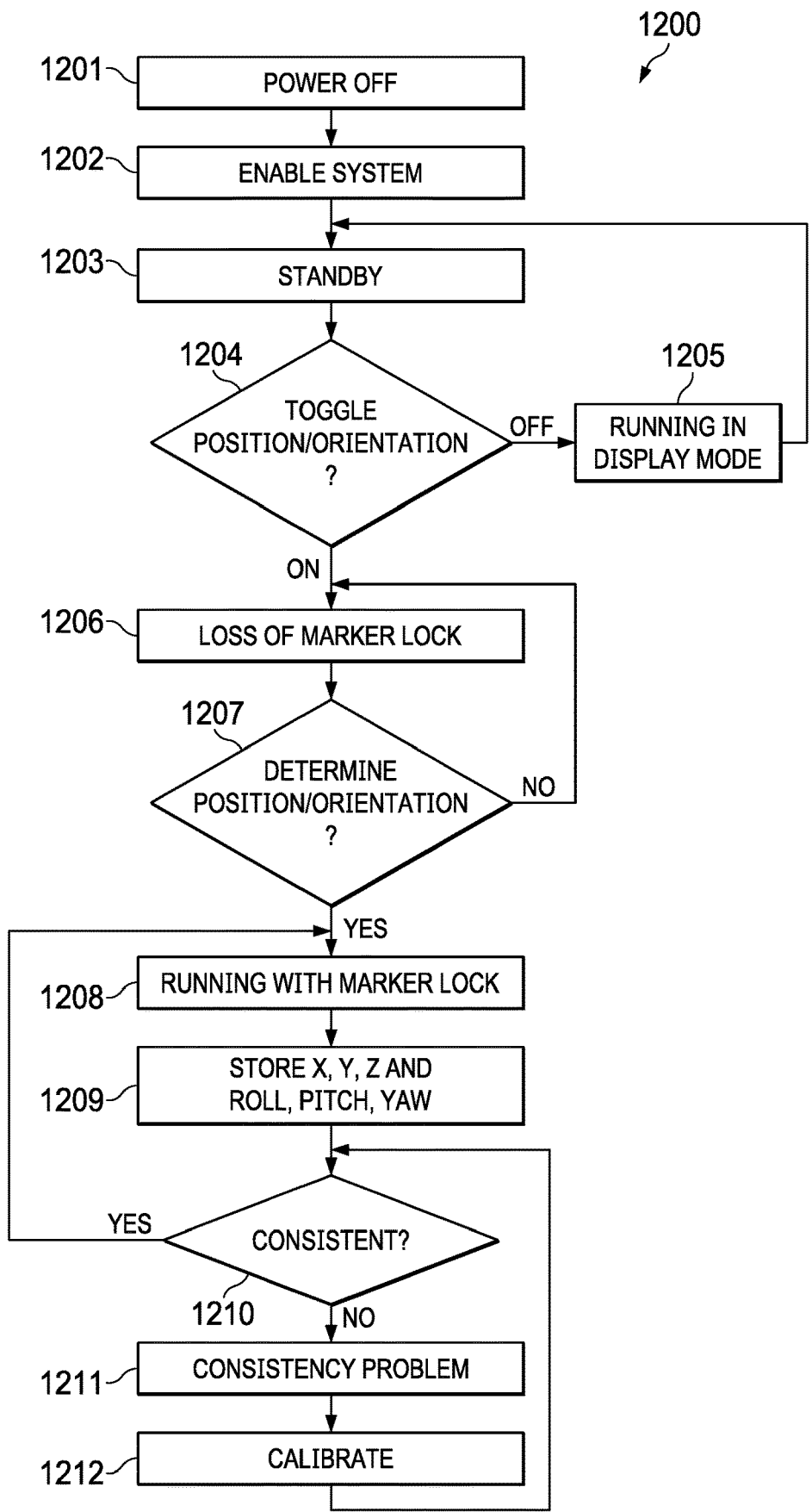
FIG. 12 is a flow chart of a state machine method of a preferred embodiment.

Referring to FIG. 12, state machine method 1200 for an augmented reality application will now be described. State machine method 1200 begins at step 1201 in a power off mode. Once the system is enabled in step 1202 by initiating power, state machine method 1200 proceeds to a standby mode at step 1203. Once a "run" command is received, state machine method 1200 proceeds to step 1204. At step 1204, a position and an orientation function of the augmented reality application is toggled on or off. If toggled off, then the augmented reality application runs in a display mode at step 1205 and optionally displays a set of data selectable by the user. The augmented reality application runs in the display mode until the user toggles the position and the orientation function on at step 1204. If turned on, then state machine method 1200 proceeds to step 1206.

At step 1206, state machine method 1200 turns on a set of cameras and begins to search for a registration marker in a loss of "marker lock" mode. At step 1207, a position and orientation of a user device is determined from the registration marker, as will be further described below. If the position and orientation of the user device cannot be determined, then state machine method 1200 returns to step 1206 to search for a registration marker. If the position and orientation of the user device is determined, then state machine method 1200 proceeds to step 1208. At step 1208, the augmented reality application runs in a "marker lock" mode, that is the position and orientation of the user device can repeatedly be determined within a predetermined time. In this step, a runtime loop for the augmented reality application is initiated and a BIM is displayed, as will be further described below. In a preferred embodiment, the predetermined time is 30 seconds. Other times may be employed.

In one embodiment, the set of data is displayed when the augmented reality application runs in the "marker lock" mode.

At step 1209, the user device determines and stores the x, y, and z positions and roll, pitch, and yaw orientation of the user device from the position sensors, as previously described.

At step 1210, a consistency is determined. In this step, if the position and orientation of the user device can be repeatedly determined within the predetermined time, then state machine method 1200 returns to step 1208. In this step, if the BIM is properly displayed, i.e., is rotated and aligned with the user point of view, then state machine method 1200 returns to step 1208. If the position and orientation of the user device cannot be repeatedly determined within the predetermined time or the BIM is not properly displayed, i.e., is not rotated and aligned with the user point of view, then state machine method 1200 proceeds to step 1211. At step 1211, a message is displayed to the user indicating a position and orientation consistency problem and state machine method 1200 begins a calibration process at step 1212, as will be further described below.

Figure 13:
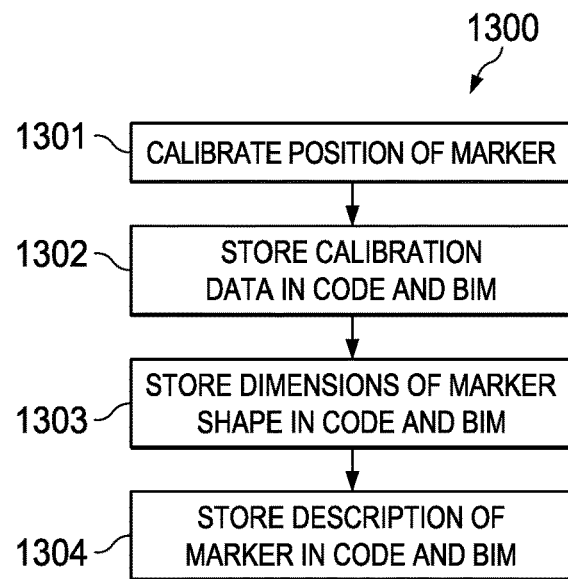
FIG. 13 is a flow chart of a method for registering a marker of a preferred embodiment.

Referring to FIG. 13, method 1300 for registering a registration marker for a BIM will be described. The registration marker includes a shape and a code, as previously described. At step 1301, a position of the registration marker is calibrated. In this step, a surveyor or a user positions the registration marker in a desired location. For example, the registration marker is placed in the middle of a wall or a column or a stud. Any desired location may be employed. Measurements are taken to ensure the registration marker is placed in the desired location. At step 1302, a set of location coordinates of the placed registration marker is stored in the code and in the BIM. At step 1303, a set of dimensions for the shape of the registration marker is stored in the code and in the BIM. At step 1304, a description of the registration marker is stored in the code and the BIM. Method 1300 is repeated for each registration marker.

Figure 14A:
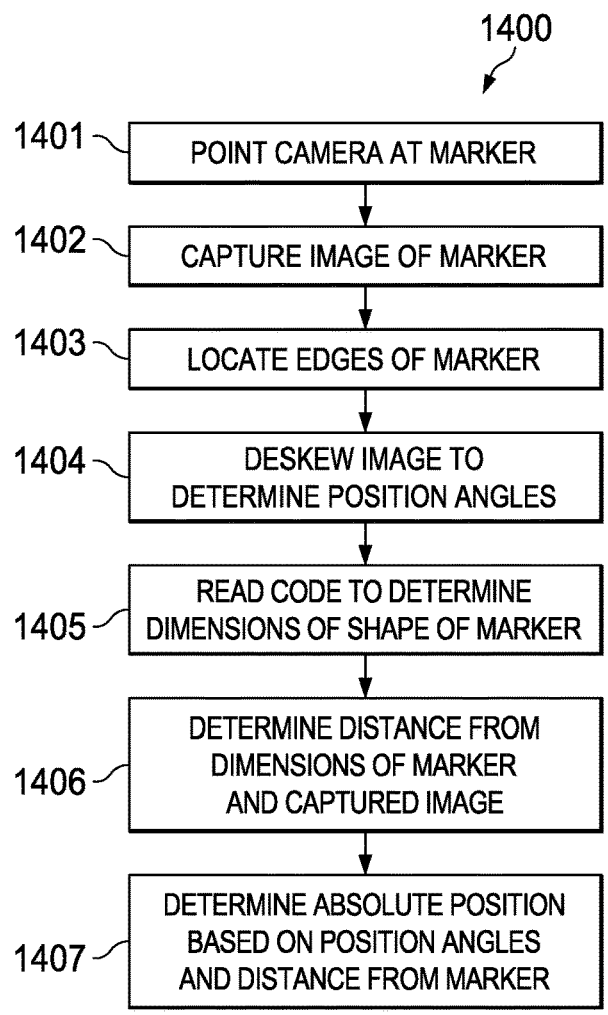
FIG. 14A is a flow chart of a method for calibrating a position of a user device of a preferred embodiment.

Referring to FIG. 14A, method 1400 for calibrating a position of a user device will be described. At step 1401, a camera of the user device is pointed at a registration marker so that the registration marker is within a field of view of the camera.

Figure 14B:
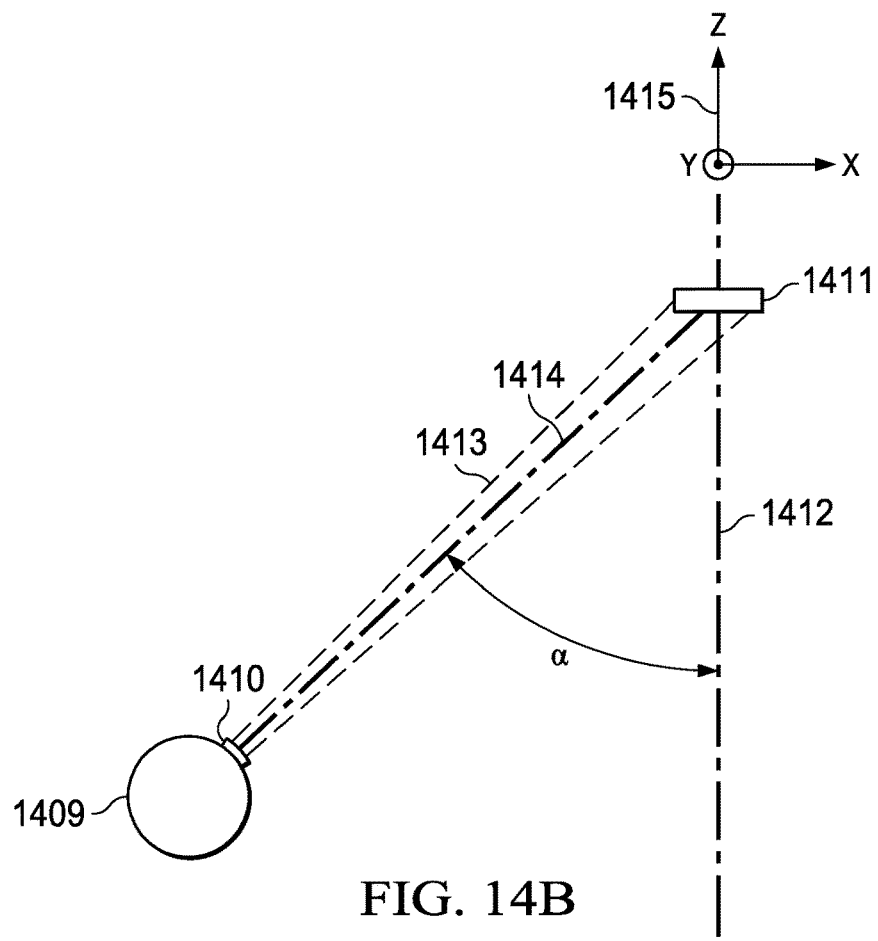
FIG. 14B is a top view schematic of a camera position with respect to a registration marker of a preferred embodiment.
Figure 14C:
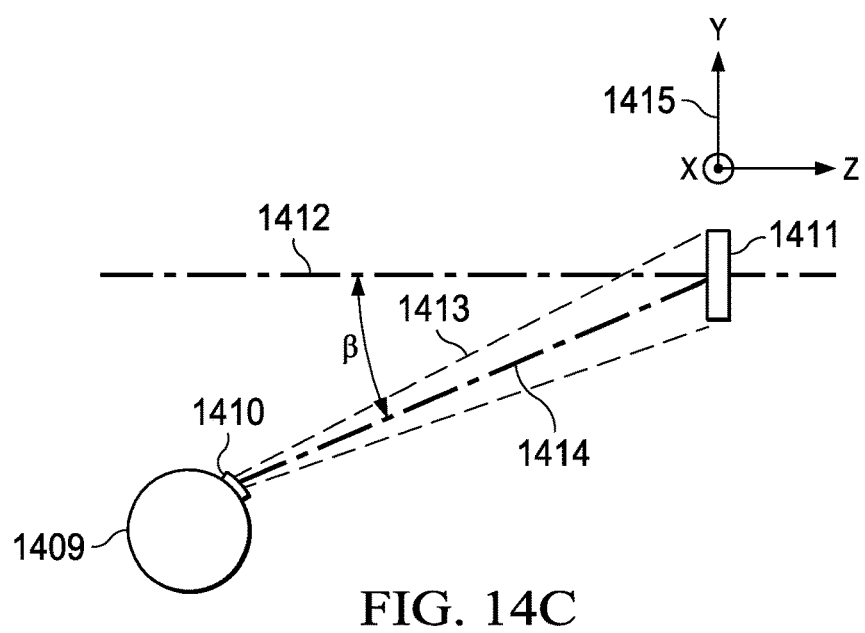
FIG. 14C is a side view schematic of a camera position with respect to a marker of a preferred embodiment.

Referring to FIGS. 14B and 14C, an offset position of user device 1409 with respect to registration marker 1411 shown in a top view and a side view, respectively, will now be described. User device 1409 has camera 1410. Camera 1410 has camera axis 1414. Registration marker 1411 is in view 1413 of camera 1410. Registration marker 1411 has marker axis 1412. Camera 1410 and user device 1409 is positioned offset with respect to registration marker 1411. Position angle $\alpha$ is the angle between marker axis 1412 and camera axis 1414 in the x-z plane of coordinates 1415. Position angle $\beta$ is the angle between marker axis 1412 and camera axis 1414 in the y-z plane of coordinates 1415. In one embodiment, registration marker 1411 is rotated about the z-axis of coordinates 1415.

Because of the offset position of user device 1409 and camera 1410 as defined by position angles $\alpha$ and $\beta$, the image of registration marker 1411 is skewed.

Returning to FIG. 14A, at step 1402, an image of the registration marker is captured by the camera.

Figure 14D:
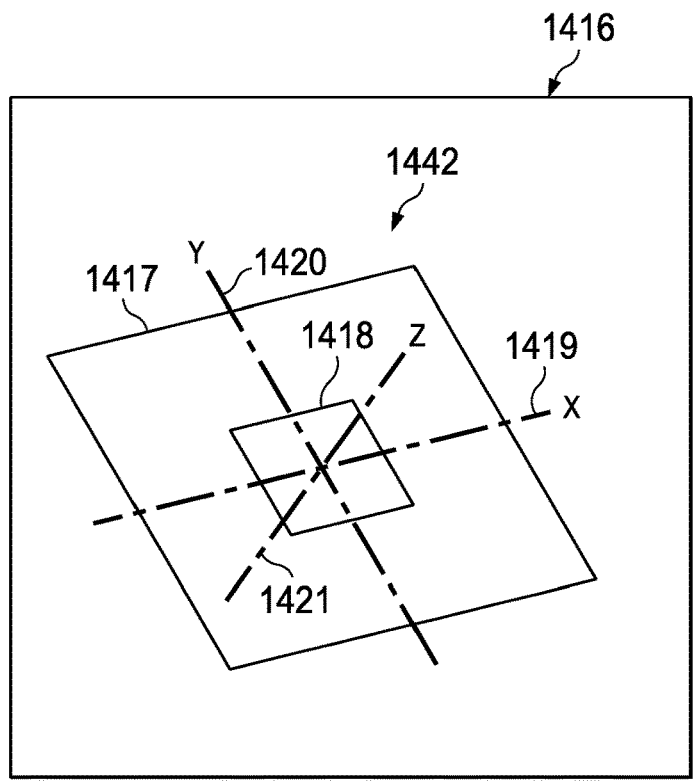
FIG. 14D is a captured skewed image of a registration marker of a preferred embodiment.

Referring to FIG. 14D, skewed image 1416 includes skewed registration marker 1442. Skewed registration marker 1442 includes skewed shape 1417 and skewed code 1418. Skewed registration marker 1442 is in the x-y plane defined by x-axis 1419 and y-axis 1420. Z-axis 1421 traverses perpendicularly through skewed registration marker 1442. As can be seen in FIG. 14D, skewed registration marker 1442 appears as a parallelogram. In this example, skewed registration marker 1442 is rotated approximately 30° about each of x-axis 1419, y-axis 1420, and z-axis 1421.

Returning to FIG. 14A, at step 1403, a set of edges in the image of the registration marker is located. In this step, Gaussian smoothing is first applied to the image to reduce noise in the image. In a preferred embodiment, Canny edge detection is then employed to locate the set of edges. In other embodiments, other edge detection means may be employed. In one embodiment, edge thinning is applied to the set of edges to remove any unwanted points. In a preferred embodiment, the set of edges is a boundary of the shape of the registration marker.

At step 1404, the image is deskewed in order to determine a set of position angles with respect to the registration marker, as will be further described below.

At step 1405 the code is read to determine the set of dimensions of the shape of the registration marker, including an actual height and an actual width. At step 1406, a distance from the camera to the registration marker is determined.

At step 1407, an absolute position of the user is calculated based on the position angles and the distance from the registration marker.

Figure 14F:
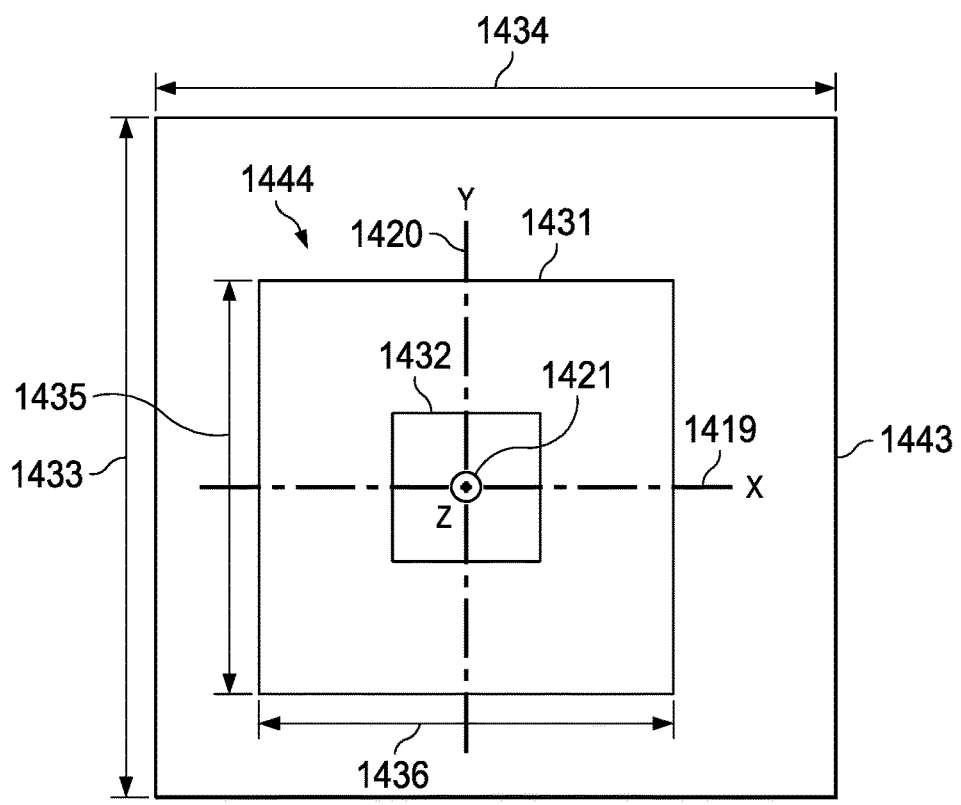
FIG. 14F is a deskewed image of a preferred embodiment.
Figure 14E:
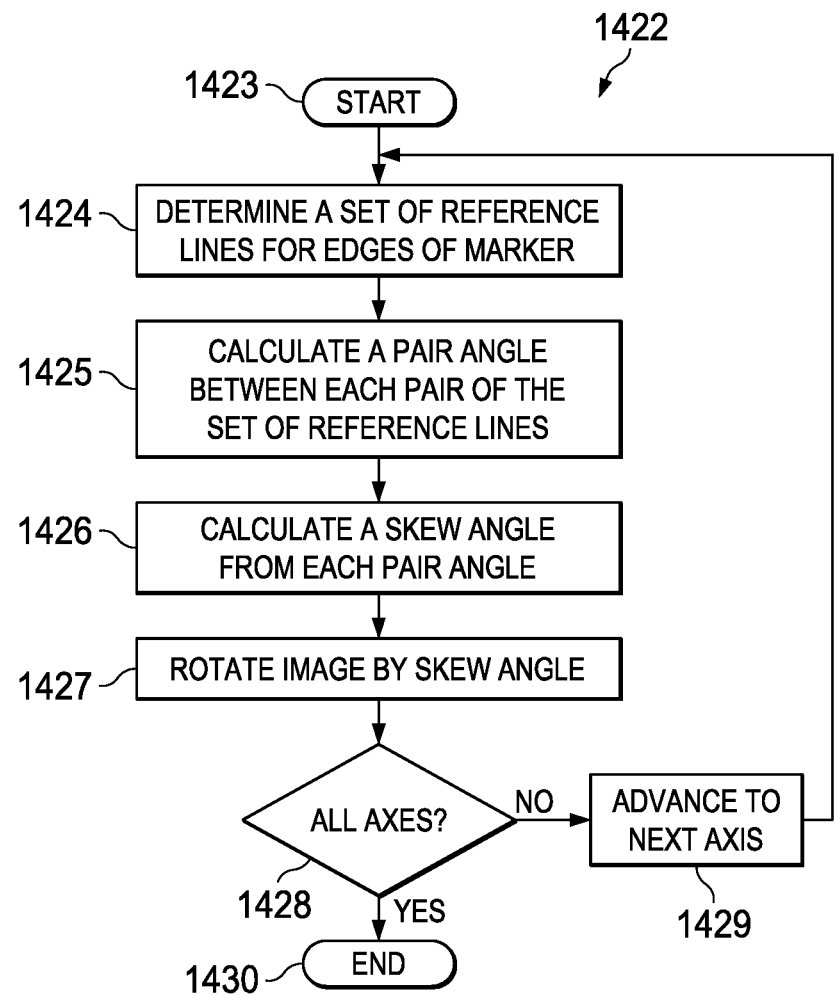
FIG. 14E is a flow chart of a method for deskewing an image of a preferred embodiment.

Referring to FIG. 14E, step 1404 will be further described as method 1422 for deskewing an image. Method 1422 begins at step 1423. At step 1424, a set of reference lines for the set of edges of a registration marker is determined. In a preferred embodiment, the set of references lines is determined by the Hough transform. Other suitable methods known in the art may be employed.

At step 1425, a pair angle is calculated between each pair of intersecting reference lines to generate a set of pair angles. At step 1426, a skew angle is calculated from set of pair angles by averaging the set of pair angles. At step 1427, the image is rotated about an axis by the skew angle. The skew angle is the position angle with respect to each axis, as previously described. At step 1428, whether or not the image has been deskewed for all axes is determined. If not, method 1422 advances to the next axis at step 1429 and returns to step 1424. If so, method 1422 ends at step 1430.

Referring to FIG. 14F, deskewed image 1443 includes deskewed registration marker 1444 along x-axis 1419, y-axis 1420, and z-axis 1421. Deskewed registration marker 1444 includes deskewed shape 1431 and deskewed code 1432. Deskewed registration marker 1444 is approximately perpendicular to z-axis 1421. Deskewed code 1432 can now be read. Deskewed image 1443 has height 1433 and width 1434. Deskewed registration marker 1444 has height 1435 and width 1436.

In a preferred embodiment, each of heights 1433 and 1435 and widths 1434 and 1436 is measured by counting the number of pixels for deskewed registration marker 1444 and deskewed image 1443.

Figure 14G:
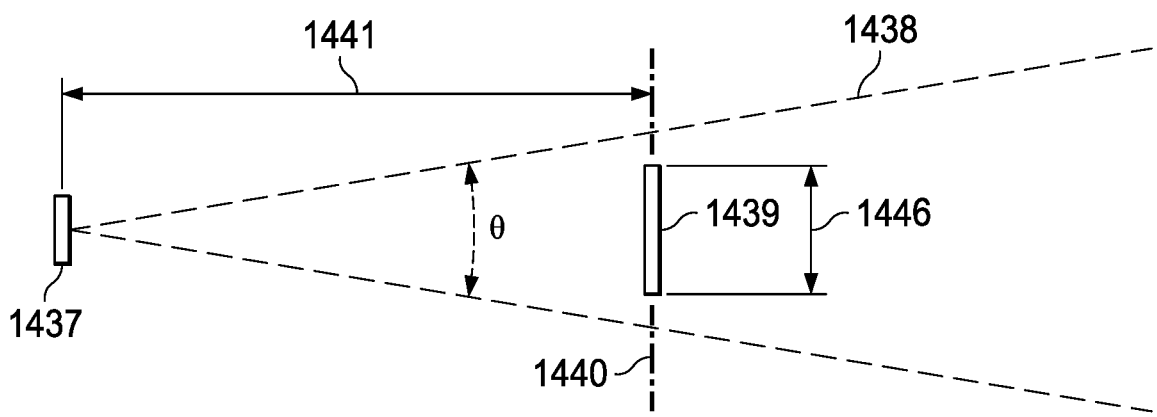
FIG. 14G is a side view schematic of a camera and a registration marker of a preferred embodiment.

Referring to FIG. 14G, step 1406 will now be further described. Camera 1437 has field of view 1438 spanning an angle θ, which varies depending on the type of camera employed. Registration marker 1439 is in plane 1440. Plane 1440 is distance 1441 from camera 1437. Height 1446 of registration marker 1439 is retrieved from a code contained in registration marker 1439. Distance 1441 is calculated by:

$$d = \frac{h}{x\tan\theta} \qquad \text{Eq. 1}$$

where d is distance 1441, h is height 1446, θ is angle θ of field of view 1438, and x is a height percentage of the height of the deskewed registration marker in the deskewed image to the height of the deskewed image. For example, if the height of the deskewed registration marker is 60% of the height of the deskewed image, then x=0.6.

Figure 14H:
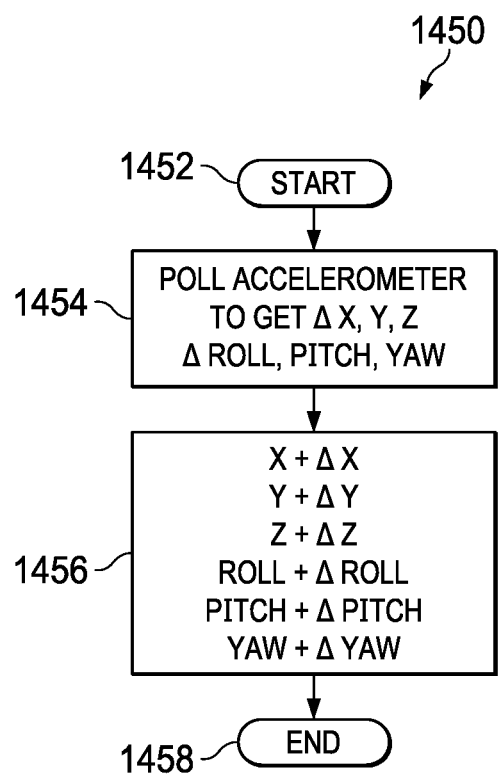
FIG. 14H is a flow chart of a method for calibrating a position of a user device.

Referring then to FIG. 14H, alternate method 1450 for calibrating a position of a user device will be described. Method 1450 starts at step 1452. At step 1454, the accelerometer is polled to determine the change in x, y, and z positions and the roll, pitch, and yaw orientations of the user device from the position and orientation stored in step 1209. At step 1456, the change in position and orientation are added to the position and orientation stored in step 1209 to determine a current position. At step 1458, the current position is returned and method 1450 ends.

Figure 15:
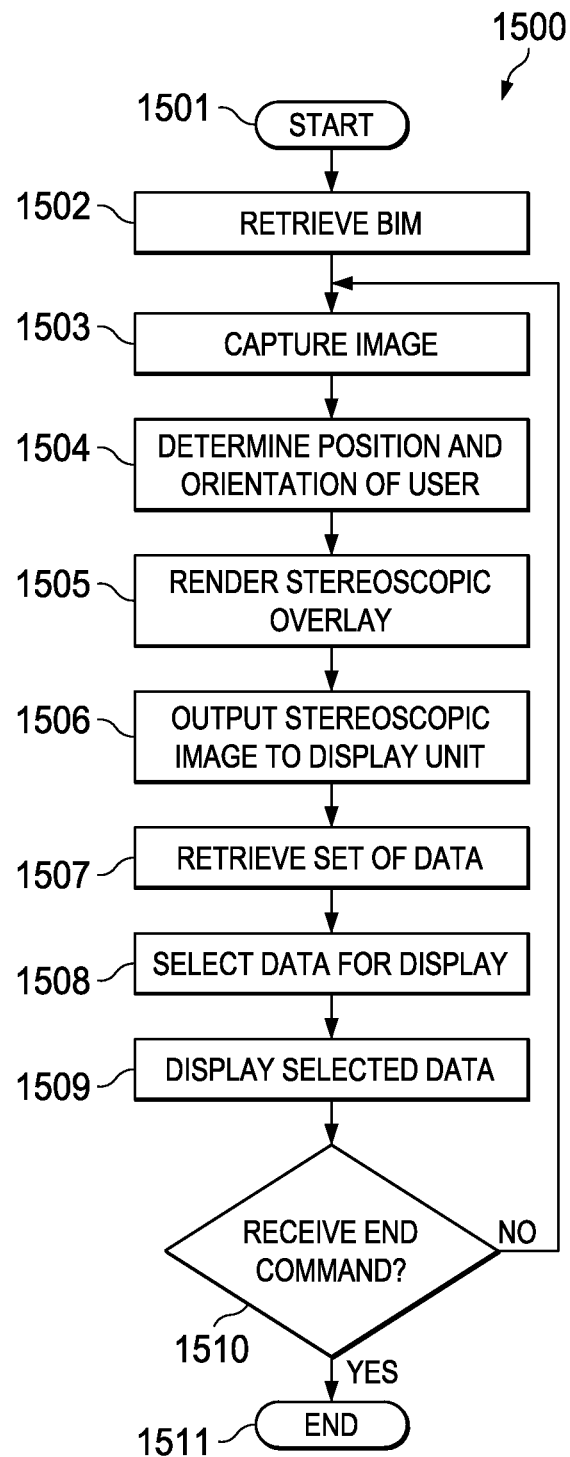
FIG. 15 is a flow chart of a runtime process of a preferred embodiment.

Referring to FIG. 15, runtime process 1500 for an augmented reality application will now be described. Runtime process 1500 starts at step 1501. At step 1502, a BIM is retrieved. In this step, the BIM is downloaded from a system administration server and saved into memory of a user device. At step 1503, an image is captured from a set of cameras. At step 1504, a position and an orientation of the user device is determined, as will be further described below. At step 1505, a stereoscopic overlay of the BIM is rendered according to the position and the orientation of the user device, as will be further described below. At step 1506, the rendered stereoscopic overlay is output to a display unit of the user device for display to the user. In a preferred embodiment, the rendered stereoscopic overlay is rendered at least 24 fps.

In one embodiment, a set of data is retrieved at step 1507. In this step, the set of data is downloaded from the system administrator and saved into the memory of the user device. In one embodiment, the position and the orientation function is deactivated. In another embodiment, the position and the orientation function remain activated. At step 1508, a subset of the set of data is selected for display including the size and the position of the selected set of data. At step 1509, the selected subset of data is displayed on the display unit.

At step 1510, a determination is made as to whether an end command has been received. If not, runtime process returns to step 1503. If so, runtime process 1500 ends at step 1511.

Figure 16:
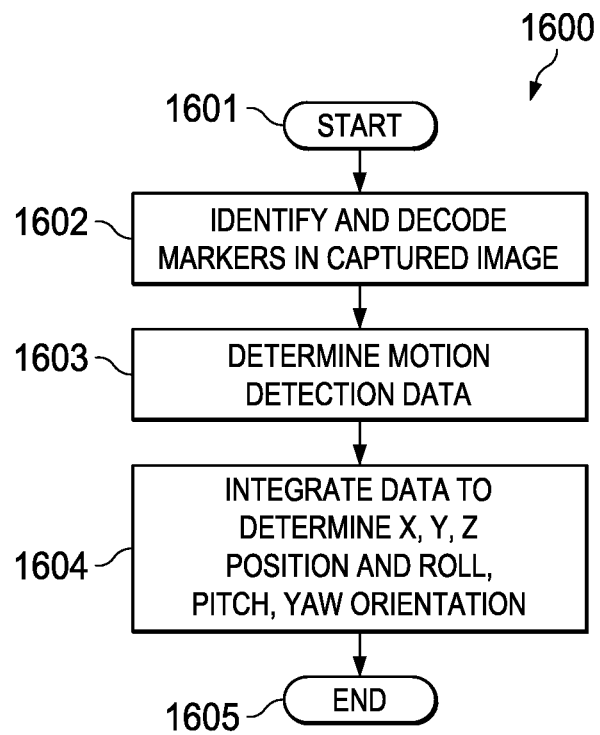
FIG. 16 is a flow chart for method of determining a position of a user device of a preferred embodiment.

Referring to FIG. 16, step 1504 will be further described as method 1600 for determining a position and an orientation of a user device. Method 1600 begins at step 1601. At step 1602, a set of registration markers is identified and decoded to determine the position of the user device. In a preferred embodiment, method 1400 is employed. At step 1603, a set of motion detection data is received from a set of sensors in the user device to determine movement of the user device. At step 1604, the set of motion detection data and the position of the user device are combined to determine an x, y, z position of the user device in reality and in the BIM and a roll, pitch, and yaw or detection of the user device in reality and the BIM. In this step, the user device determines which camera captured the image of the registration marker, i.e., a temporal camera or a camera of the camera matrix. If the camera of the camera matrix captures the images, then a difference angle is calculated between an axis of the camera of the camera matrix and an axis of the temporal camera. The orientation is calculated from the set of position angles and the difference angles. The set of motion detection data received is the roll, pitch, and yaw orientation movement of the head of the user. Method 1600 ends at step 1605.

Figure 17:
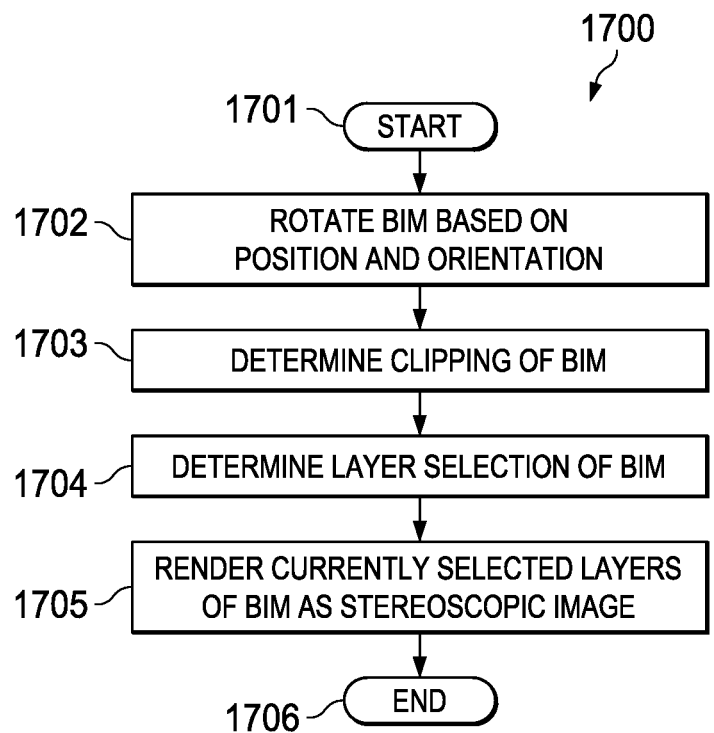
FIG. 17 is a flow chart for a method of rendering a stereoscopic overlay for a user device of a preferred embodiment.

Referring to FIG. 17, step 1505 will be further described as method 1700 for rendering a stereoscopic overlay according to the position and the orientation of the user device for a user device. Method 1700 begins at step 1701. At step 1702, a BIM is rotated and magnified based on the position and the orientation of the user device. At step 1703, the BIM is "clipped" based on a set of barriers in the BIM, i.e., the nearest set of walls. For example, if the user is standing the middle of a room, the BIM is "clipped" to only show the room of the BIM in which the user is standing. Otherwise, the entire BIM of the entire building would be shown to the user. At step 1704, a layer selection of the BIM is determined from the command menu. At step 1705, the selected layers of the "clipped" BIM is rendered as a stereoscopic image, i.e., the BIM image is rendered as a pair of BIM images, a left BIM image for a left display unit and a right BIM image for a right display unit of the user device. Method 1700 ends at step 1706.

In a preferred embodiment, the left BIM image and the right BIM image are shifted with respect to each other, in a range of approximately 2.5 to 3 inches to compensate for the average distance between the pupils of human eyes.

Figure 18:
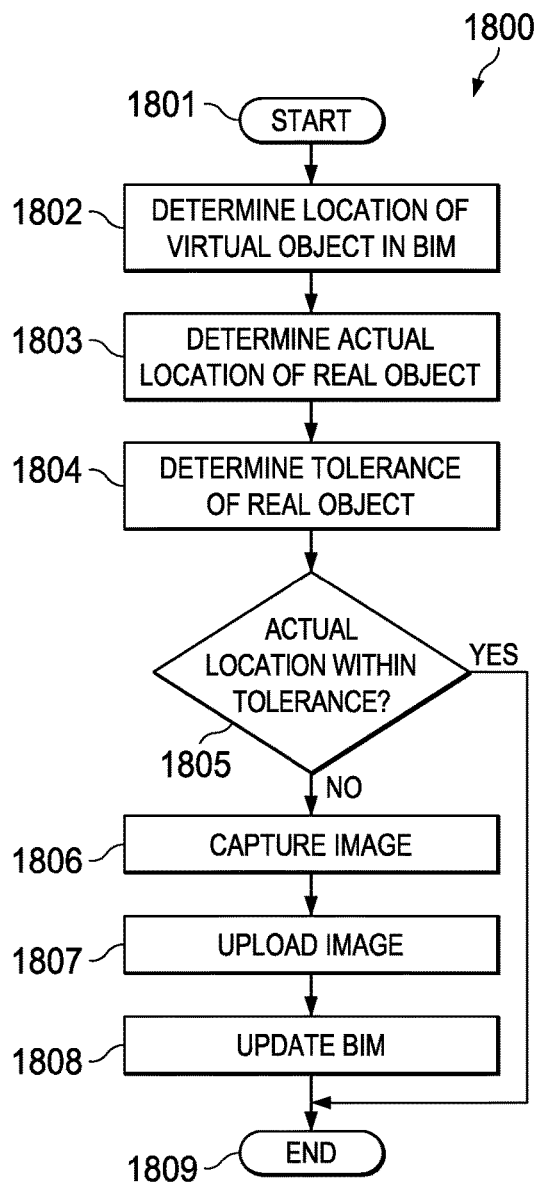
FIG. 18 is a flow chart of a method for updating a building information model of a preferred embodiment.

Referring to FIG. 18, method 1800 for updating a BIM will now be described. Method 1800 begins at step 1801. At step 1802, a virtual location of a virtual object in the BIM is determined by viewing the virtual location on a display unit of a user device. At step 1803, an actual location of a real object associated with the virtual object is determined.

At step 1804, a tolerance for the real object location is determined by any measuring means. In a preferred embodiment, the tolerance is determined by a set of building codes. At step 1805, the actual location is compared to the virtual location to determine whether the actual location is within the tolerance. If so, then method 1800 ends at step 1809. If the actual location is not within the tolerance, then method 1800 proceeds to step 1806. At step 1806, an image is captured of the actual location and the virtual location as seen through the display by the user. At step 1807, the captured image is uploaded to a system administrator server. At step 1808, the captured image is saved in the BIM as a "mistakes" layer. The "mistakes" layer is then a selectable layer in the BIM once a user reloads the BIM to the user device from the system administrator server. Method 1800 ends at step 1809.

Figure 19:
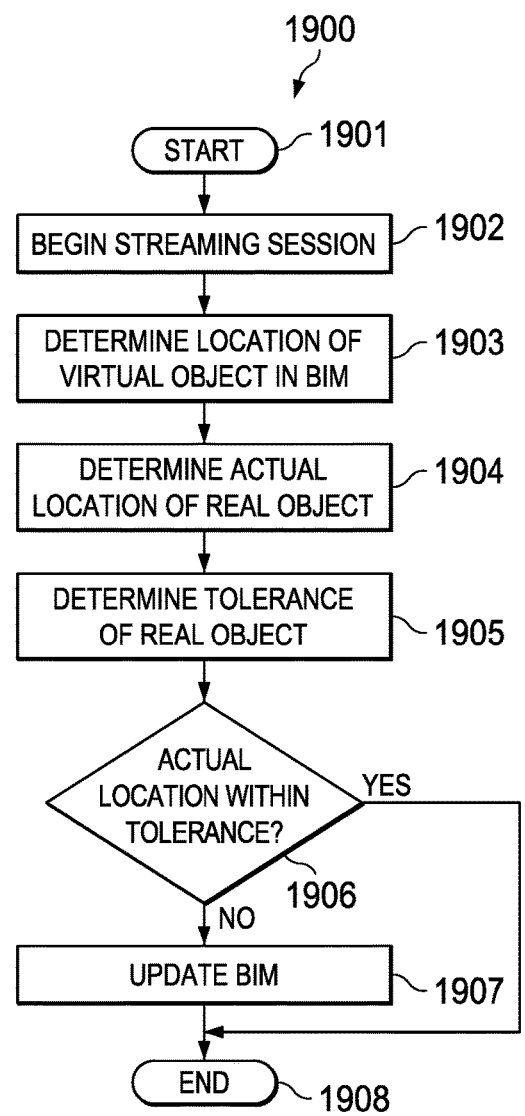
FIG. 19 is a flow chart of a method for updating a building information model of a preferred embodiment.

Referring to FIG. 19 in another embodiment, method 1900 for updating a BIM will now be described. Method 1900 begins at step 1901. At step 1902, a streaming session between a user device and a system administrator server is initiated and a video is captured and streamed in real time to the system administrator server. The video includes the point of view of the user captured by a camera with the overlaid BIM. At step 1903, a virtual location of a virtual object in the BIM is determined by viewing the virtual location on the display. At step 1904, an actual location of a real object associated with the virtual object is determined. At step 1905, a tolerance for the real object location is determined by any measuring means. In a preferred embodiment, the tolerance is determined by a set of building codes. At step 1906, the actual location is compared to the virtual location to determine whether the actual location is within the tolerance. If so, then method 1900 ends at step 1908. If the actual location is not within the tolerance, then method 1900 proceeds to step 1907. At step 1907, the video is saved in the BIM in a "mistakes" layer as a selectable element, such as an icon or link. The "mistakes" layer is then a selectable layer in the BIM once a user reloads the BIM to a wearable computer from the system administrator server. The user selects the selectable element to stream and view the video. Method 1900 ends at step 1908.

Figure 20:
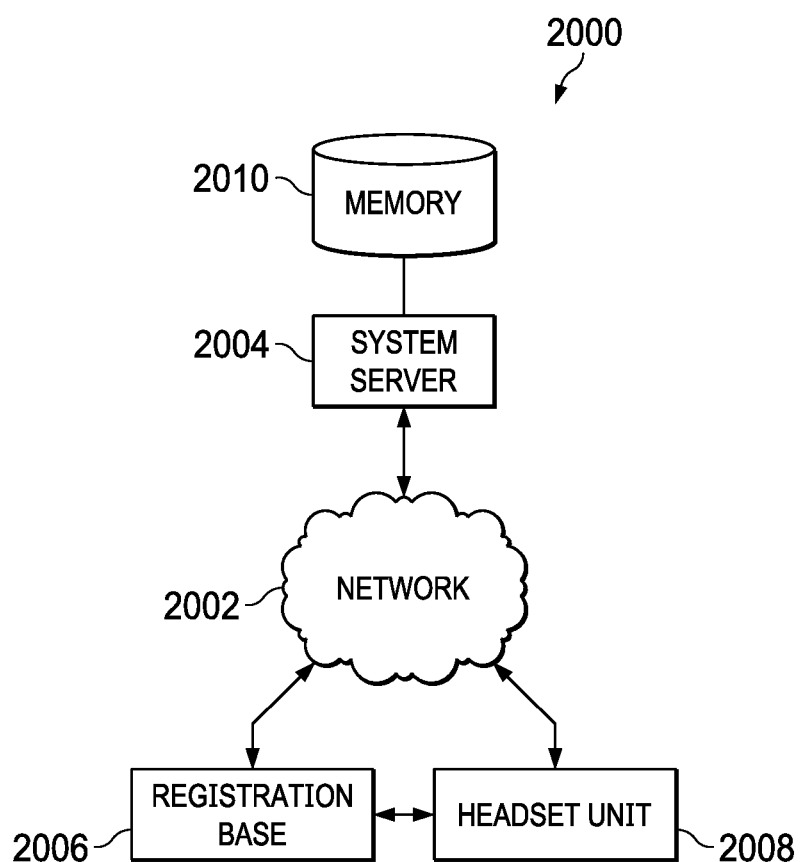
FIG. 20 is an architecture drawing of a virtual display system for indicator coordinates.

Referring to FIG. 20, system 2000 includes network 2002, system server 2004, registration base 2006 and visor 2008. The system server is further connected to memory 2010. Registration base 2006 is connected to and communicates with system server 2004 through network 2002. Registration base 2006 further communicates with visor 2008 through a local network connection. In a preferred embodiment, the local network connection is wireless. In an alternate embodiment, registration base 2006 can connect to and communicate with visor 2008 through network 2002, and local network connections.

Figure 21:
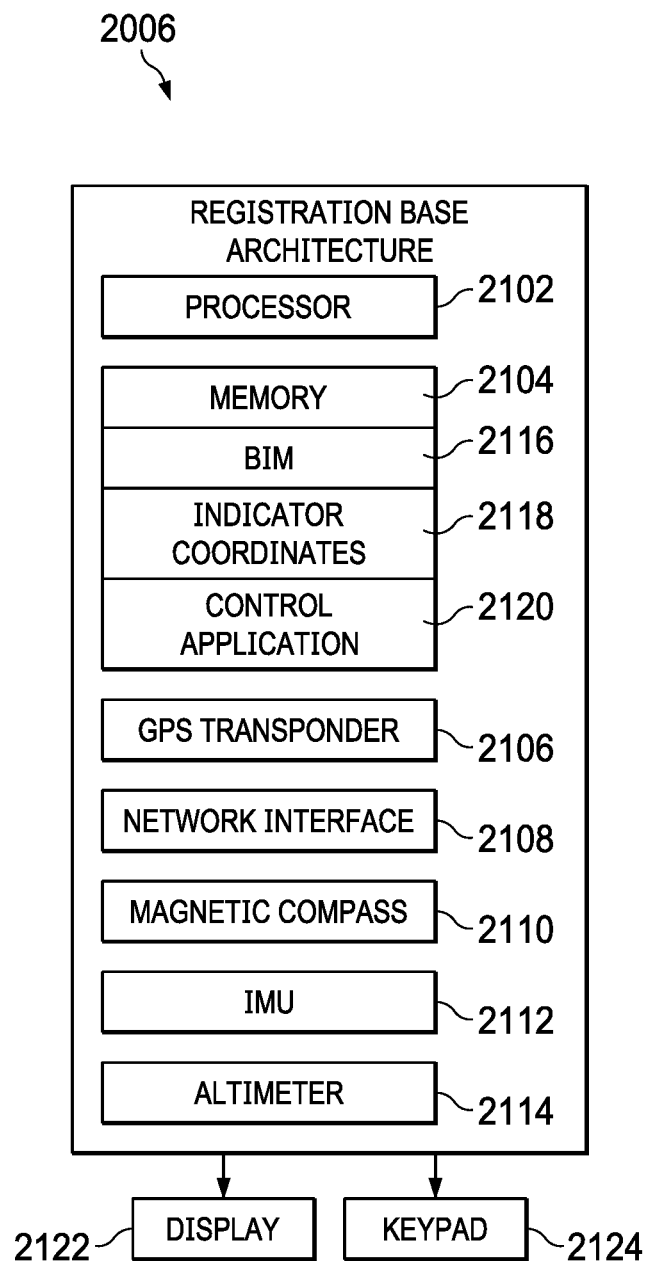
FIG. 21 is an architecture diagram of a registration base.

Referring to FIG. 21, registration base 2006 includes processor 2102, memory 2104, GPS transponder 2106, network interface 2108, magnetic compass 2110, internal measurement unit (IMU) 2112 and altimeter 2114.

In a preferred embodiment, processor 2102 is the Raspberry Pi 3.0 available from Adafruit Industries of New York, New York. Memory 2104 is operatively connected to the processor and comprises a removable 4 gigabit memory card in a preferred embodiment.

GPS transponder 2106 in a preferred embodiment is the Raspberry Pi GPRS/GPS Tracker HAT available from Sixfab of Berlin, Germany.

In a preferred embodiment, a magnetic compass 2110 is the triple axis accelerometer and magnetometer compass board LSM303 available from Adafruit Industries.

In a preferred embodiment, IMU 2112 is the three axis accelerometer and three axis gyro available from Kootek Part No. GY-521NPU-6050. In a preferred embodiment, altimeter 2114 is the MPL3115A2 pressure sensor including an I2C interface for pressure, altitude and temperature data. The part is available from Adafruit Industries.

Memory 2104 further includes BIM 2116, indicator coordinates 2118 and control application 2120. In a preferred embodiment, the indicator coordinates are a single point or a set of singular points located in three-dimensions which serve as locator points in the BIM model for positioning of equipment or other required fixtures or post construction modifications. Indicator coordinates 2118 can also include a linear locus of points (such as a line) along a horizontal or vertical surface in the BIM. Likewise, the indicator coordinates can also be a plane of points located in the BIM. Other loci of points which indicate spherical surfaces, cylindrical surfaces, or rectangular surfaces can be included in the indicator coordinates, as can complex lines shown around corners and installed equipment.

Control application 2120 serves as command instructions to the processor to communicate with display 2122 and keypad 2124 and coordinates harvesting and use of data from the various components and communication with the processor.

Registration base 2006 further comprises display 2122 and keypad 2124 which are operatively connected to processor 2102.

Figure 22:
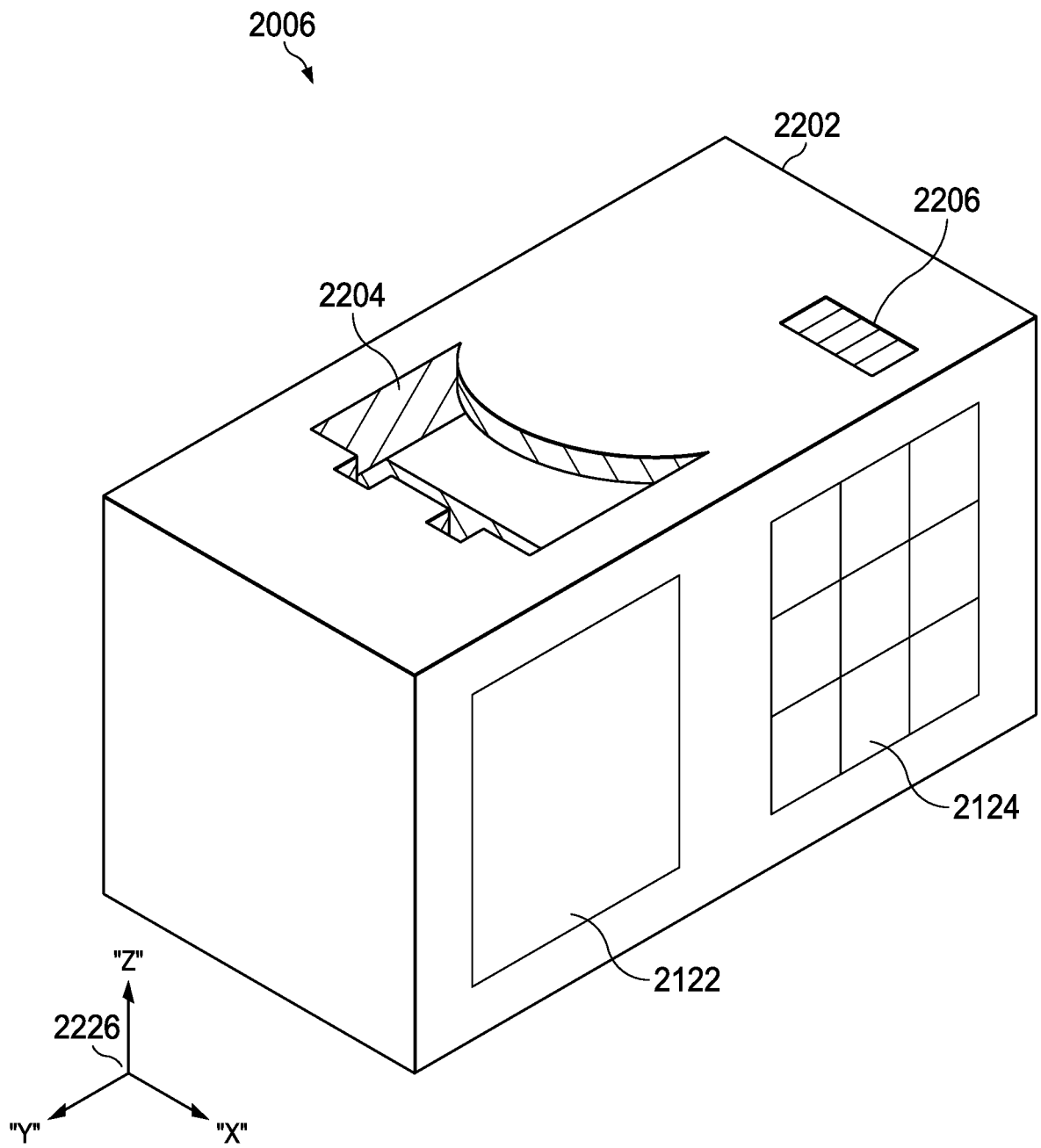
FIG. 22 is an isometric view of a preferred registration base.

Referring then to FIG. 22, a preferred embodiment of registration base 2006 will be described. Registration base 2006 includes external container 2202. External container 2202 provides support for display 2122 and keypad 2124. The external container further comprises appropriate standoffs and mounting hardware for securing waterproof positioning of processor 2102 and memory 2104, network interface 2108, magnetic compass 2110, IMU 2112 and altimeter 2114. Network interface 2108 is connected to external network connector 2206.

In a preferred embodiment, the top surface of external container 2202 includes docking portal 2204. Docking portal 2204 is oriented in a fixed and exact position with respect to BIM origin position indicator 2226, and forms a rigid mounting position for the removable headset unit, as will be further described. When the headset unit is in the docking portal it is important that the headset unit be fixed in a known position with respect to the external container within preferable tolerances of about ±0.025° roll/pitch/yaw, and ±⅛" in each of the x, y and z directions, relative to the external container. The fixed position of the headset with respect to the docking portal is important because it determines the origin of the headset for virtual positioning of the indicator coordinates. Other tolerances may be used. More exacting tolerances result in a more precise display of the virtual indicator coordinates when the headset is in use and require less recalibration. Less exacting tolerances allow easier positioning of the headset, but require recalibration more often.

Figure 23:
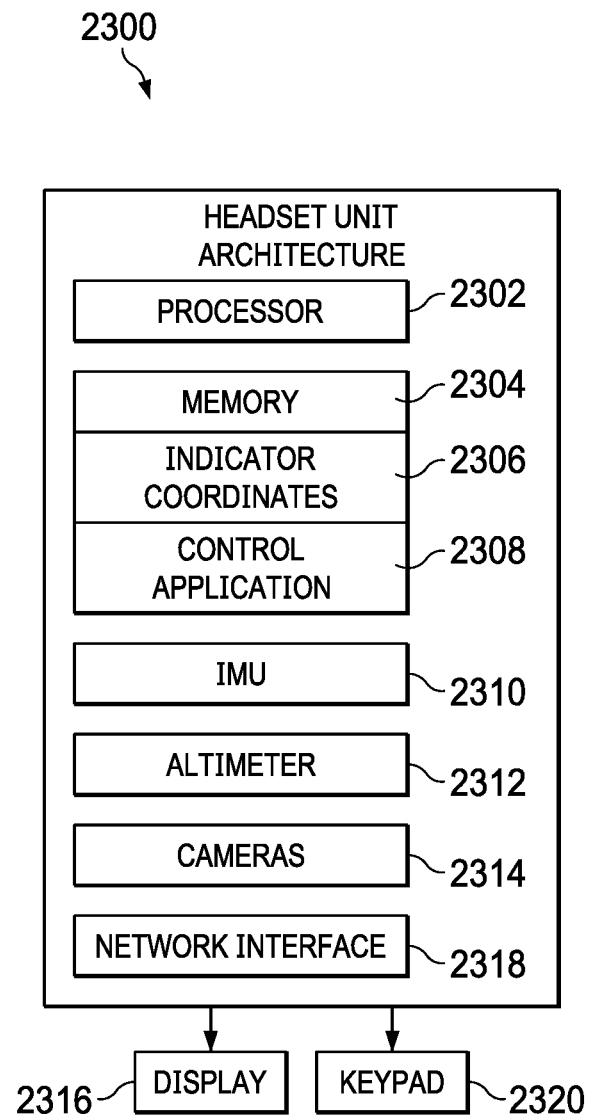
FIG. 23 is an architecture diagram of a headset unit of a preferred embodiment.

Referring then to FIG. 23, a preferred embodiment of headset unit 2300 will be described.

Headset unit 2300 includes processor 2302 operatively connected to memory 2304, IMU 2310, altimeter 2312, cameras 2314, display 2316, keypad 2320, and network interface 2318. Processor 2302 in a preferred embodiment, is comprised of Raspberry Pi 3 Model B available from Adafruit Industries.

Memory 2304 in a preferred embodiment includes a 4 gigabit memory card. Resident on the 4 gigabit memory card are indicator coordinates 2306 and control application 2308. Control application 2308 provides instructions for the processor and communications with IMU 2310, altimeter 2312, cameras 2314, display 2316 and network interface 2318, as will be further described.

IMU 2310 is in a preferred embodiment, is the three axis accelerometer and three axis gyro available from Kootek Part No. GY-521NPU-6050.

Altimeter 2312 is preferably a MPL3115A2 pressure sensor including an I2C interface for pressure, altitude and temperature data. The part is available from Adafruit Industries.

Camera 2314 in a preferred embodiment, is the MYNT® Eye Standard stereoscopic camera available from Slightech, Inc. of Santa Clara, California.

In one preferred embodiment, headset unit 2300 comprises a mixed reality unit available from Oculus VR, LLC known as the Oculus Rift headset. The cameras allow high resolution wide angle viewing with dual eye synchronization and appropriately low latency times. Communication with the processor is carried out through the GPIO communications channel. In a preferred embodiment, a wide angle lens is provided in each camera, capable of supporting 120° viewing angle, and a delay of 50 microseconds at 50 frames per second.

In another embodiment, headset unit 2300 comprises the HTC Vive headset available from HTC Corporation. In this embodiment, camera 2314 is the onboard stereo cameras available on the HTC Vive unit and are employed in a "passthrough" mode.

In yet another embodiment, headset unit 2300 comprises the HMD Odyssey mixed reality headset available from Samsung of Seoul, South Korea. In this embodiment, the stereo camera is likewise the onboard camera system of the HMD Odyssey system employed in "passthrough" mode.

Figure 24A:
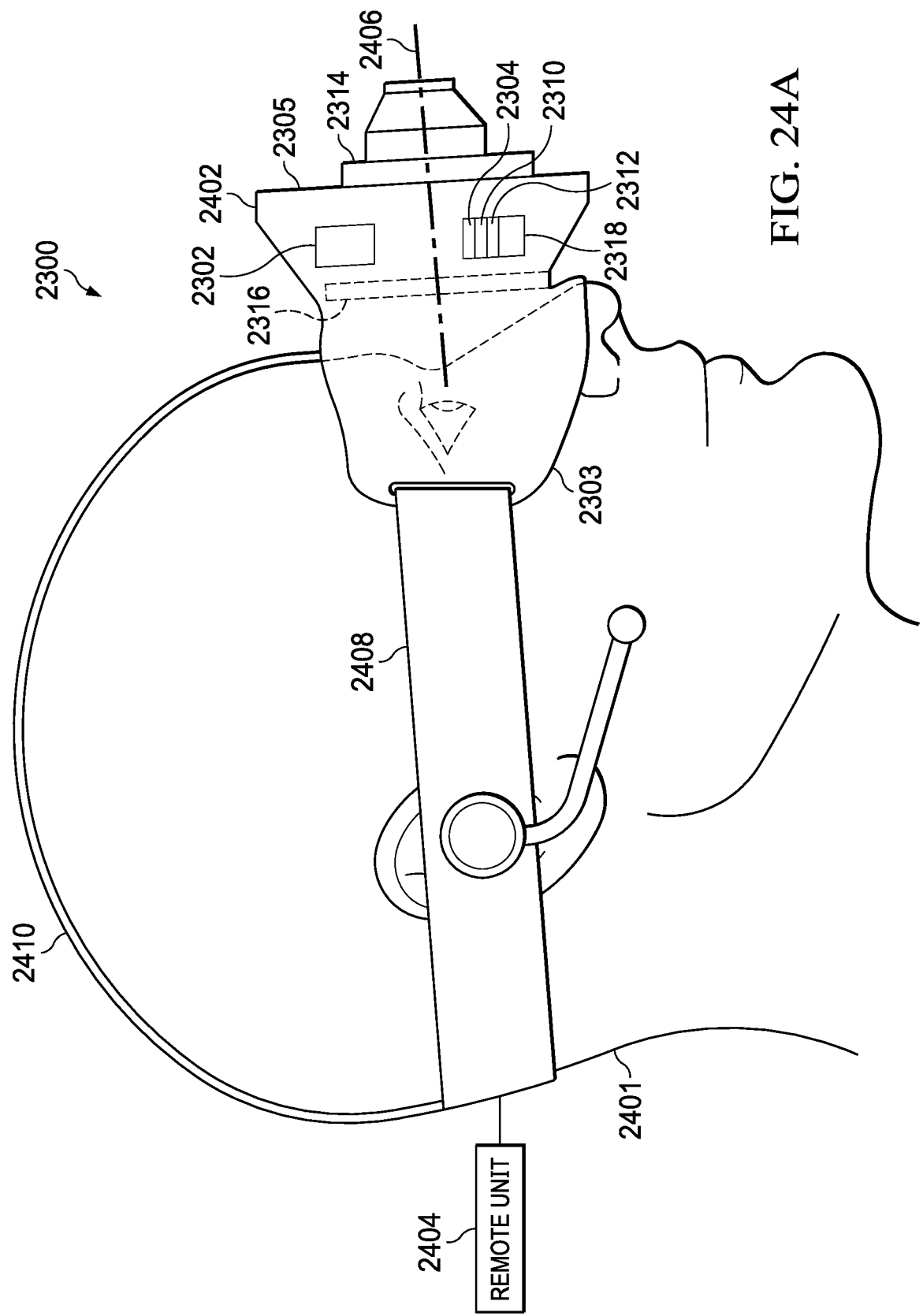
FIG. 24A is a side view of a headset unit of a preferred embodiment.
Figure 24B:
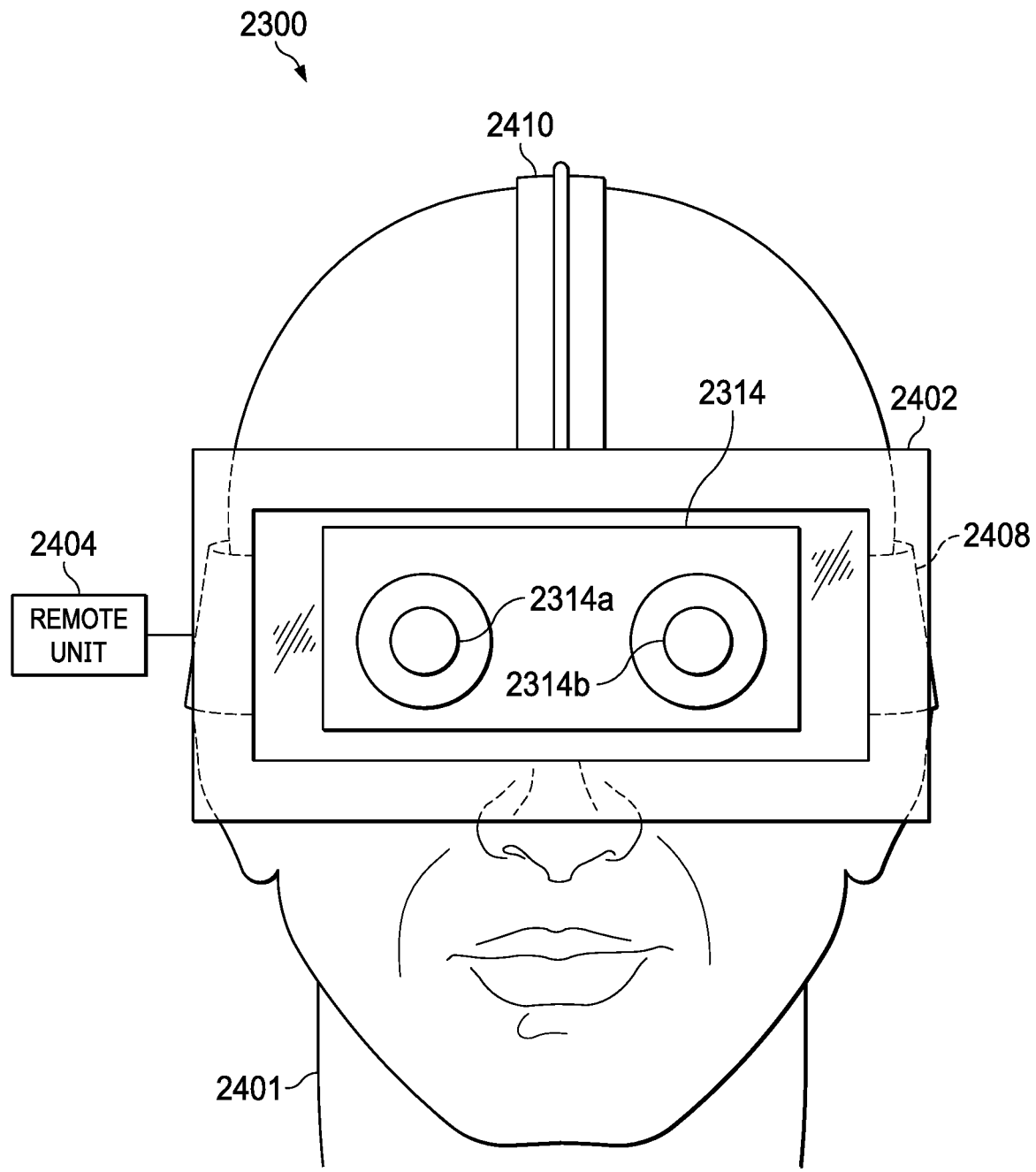
FIG. 24B is a front view of a headset unit of a preferred embodiment.

Referring then to FIGS. 24A and 24B, a preferred embodiment of the headset unit will be described. Headset unit 2300 comprises straps 2408 and 2410 which are worn by user 2401. Visor 2402 includes a hood 2303 adapted to fit the users face. The hood positions the visor in front of the user's eyes along visual axes 2406. Visual axes 2406 includes a left axis and a right axis that are in the same visual plane, one axis coaxial with each of the user's eyes. Visor 2402 includes plastic housing 2305 which secures display 2316 in front of the user's eyes. Visor 2402 further comprises suitable mounting hardware (not shown) for mounting processor 2302, memory 2304, IMU 2310, altimeter 2312 and network interface 2318. Visor 2402 also forms a suitable support for camera 2314 and stereo lenses 2314a and 2314b which can be seen to be positioned directly in front of each of the users eyes. In a preferred embodiment, visor 2402 is also connected to remote unit 2404 which can include wearable batteries for powering the processor and other related computing components and network communication.

Figure 25:
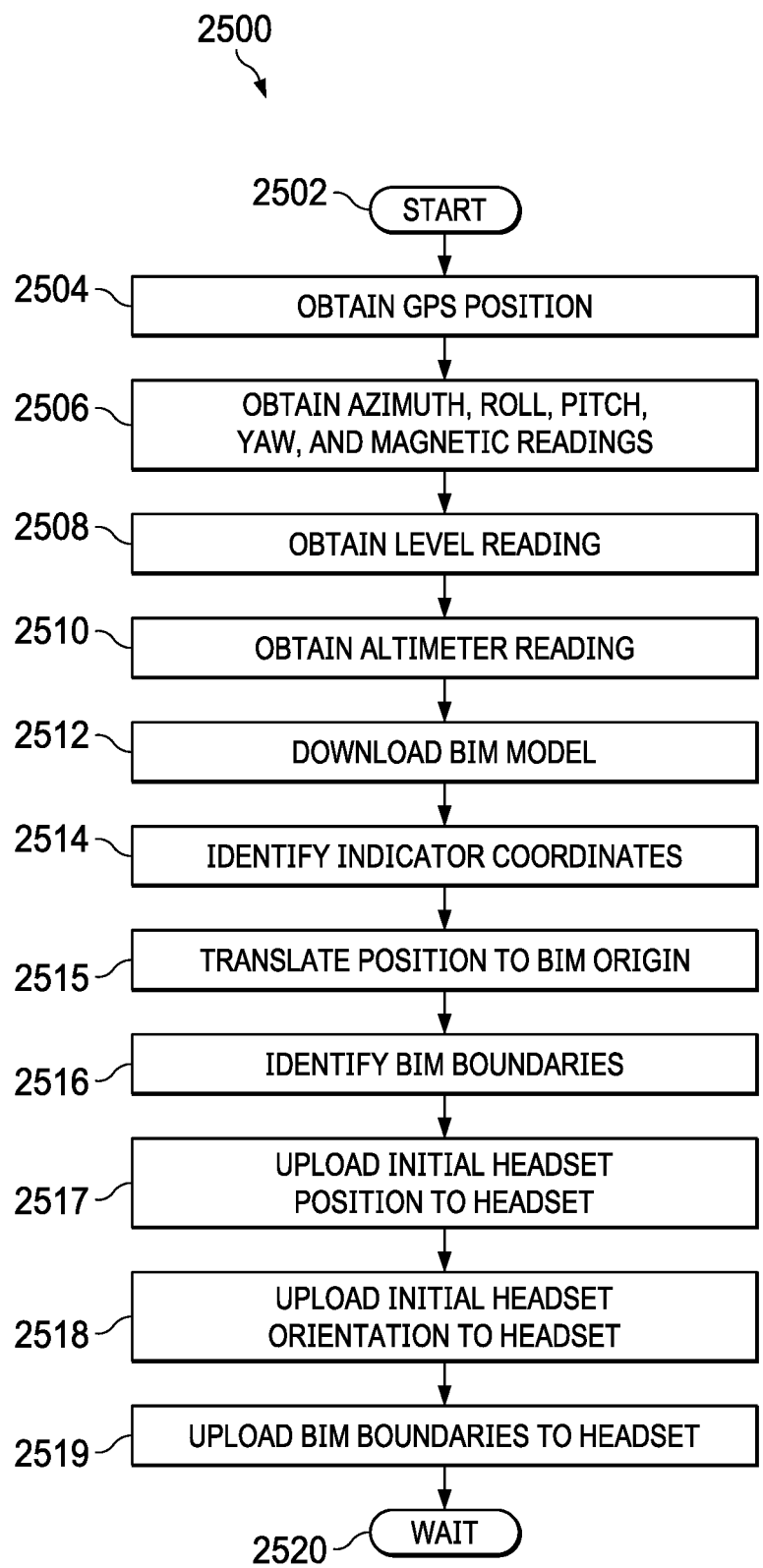
FIG. 25 is a flow chart of a preferred method of operation of a registration base.

Referring to FIG. 25, the preferred operation of the registration base carried out in software is described as method 2500.

Method 2500 is preferably written C code and is resident in memory 2104 as control application 2120.

As step 2502, the process begins. At step 2504, processor 2102 obtains the GPS position of the registration base from GPS transponder 2106. At step 2506, the azimuth, roll, pitch, yaw readings are obtained. At this step, the compass heading is also determined. At step 2508, the processor obtains a level reading from IMU 2112. The level reading indicates the direction of any initial pitch, roll and yaw of the registration base. At step 2510, the processor obtains an altimeter reading from altimeter 2114. The altimeter reading forms the initial height reading for the registration base.

At step 2512, the processor downloads the BIM model through the network interface from system server 2004.

At step 2514, the processor identifies the indicator coordinates and the BIM origin from the BIM model. The BIM origin is the x=0, y=0, z=0 GPS position of the BIM.

At step 2515, the registration base is physically relocated until the GPS coordinates of the registration base match the GPS coordinates of the BIM origin. In a preferred embodiment, the processor sends relocation instructions to the display and indicates when the registration base is located at the BIM origin. In another embodiment, the processor is not positioned directly at the BIM origin, but rather at a known distance from the BIM origin. In this case, the processor determines its GPS coordinates and then calculates an offset translation distance and rotation angle necessary to determine the relative position of the registration base with respect to the BIM origin. This embodiment is useful when the BIM origin is distant from the location in the building where the headset is to be used.

At step 2516, the processor identifies the BIM boundaries based on the GPS position. In a preferred embodiment, the BIM boundaries are physical boundary surfaces such as the walls, floor and ceiling bounding the GPS position where the registration base is located. In most cases, the indicator coordinates will be positioned against one of these boundary surfaces.

At step 2517, the processor uploads the initial headset x, y, z position to the headset, as will be further described.

At step 2518, the processor uploads the initial headset roll, pitch, yaw orientation to the headset, as will be further described.

At step 2519, the processor uploads the BIM boundaries to the headset.

At step 2520, the processor enters a wait state and continuously polls keypad 2124 for a restart indication. Also, at step 2520 an indication may be sent from the processor to the display indicating the wait state and the status of the registration base and/or the headset.

Figure 26A:
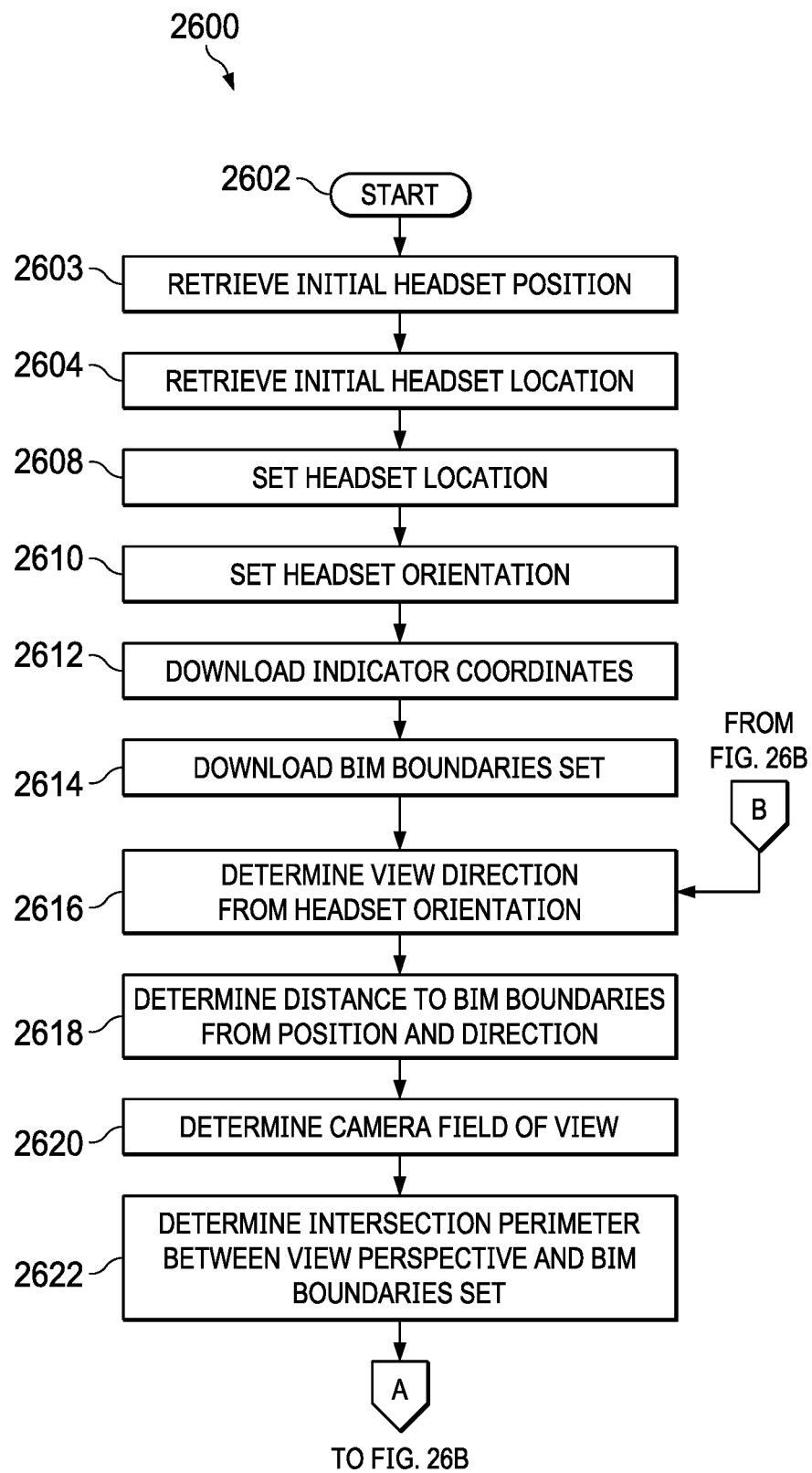
FIGS. 26A and 26B is a flow chart of a preferred method of operation of a headset unit.
Figure 26B:
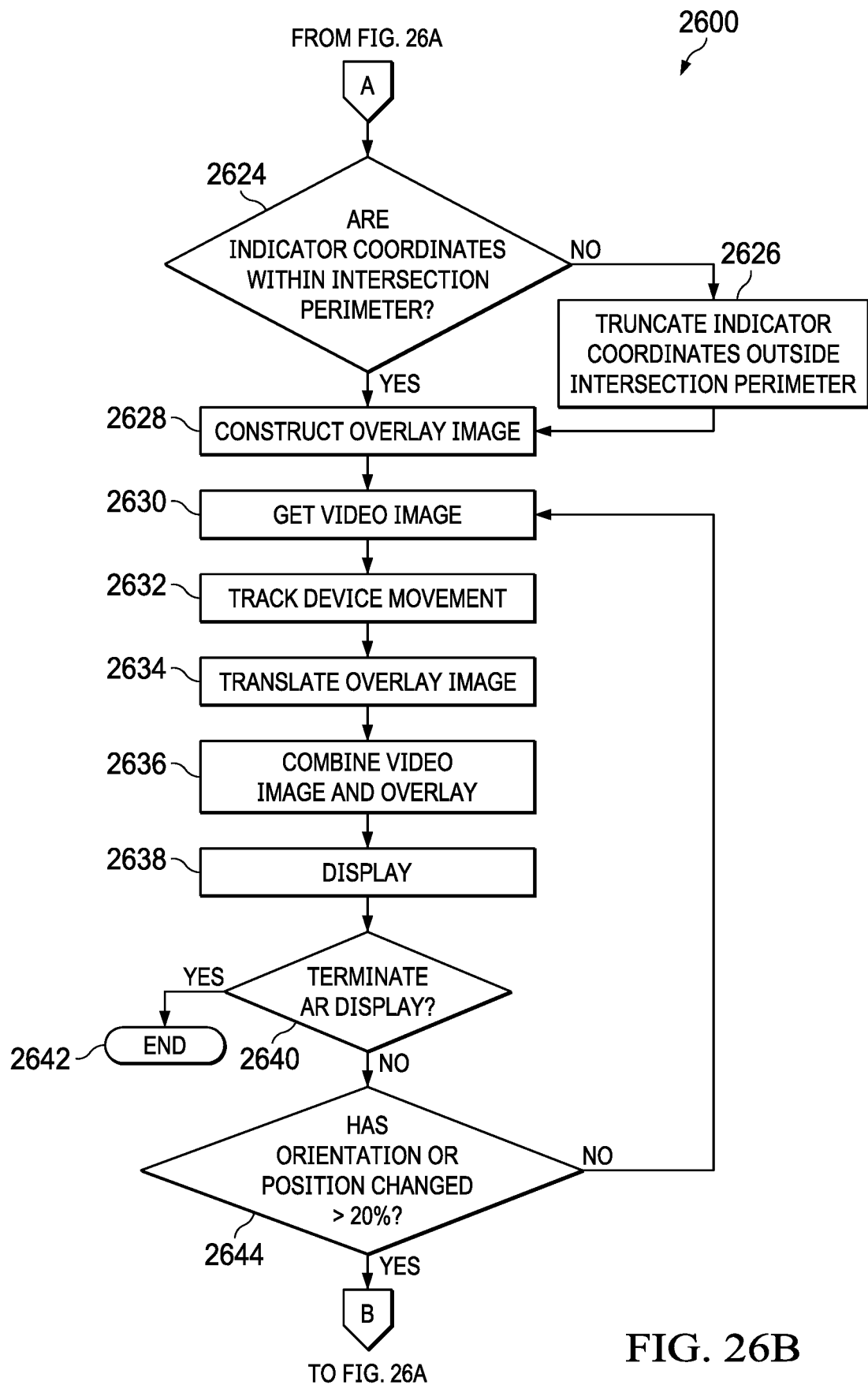

Referring then to FIGS. 26A and 26B, method 2600 of operation of the headset will be described. Method 2600 preferably is carried out by software written in C code and resident in memory 2304 of headset unit 2300 and serving as operating instructions for processor 2302.

At step 2602, the method begins.

At step 2603, processor 2302 retrieves the initial headset position from the registration base through network interface 2318. At step 2604, processor 2302 retrieves the initial headset orientation from the registration base through network interface 2318.

At step 2608, processor 2302 sets the initial headset location. The initial headset location is the GPS coordinates in the x, y plane. The initial headset location also includes the initial altitude reading which is the location in the z direction, as will be further described.

At step 2610, the processor then sets the initial headset orientation. The initial headset orientation is equivalent to the initial headset orientation uploaded from the registration base. It includes the initial roll/pitch/yaw readings and the compass heading for the headset.

At step 2612, processor 2302 downloads the indicator coordinates for display. The download includes all the indicator coordinates for the BIM model.

At step 2614, the processor downloads the BIM boundary set. In one preferred embodiment, the BIM boundary set is the coordinates of the walls, ceiling and floor of the room in the construction area where the registration base is initially located according to its GPS coordinates. In a preferred embodiment, the BIM boundary set can include other physical boundaries such as equipment boundaries, tool boundaries and other fixed surfaces.

At step 2616, a view direction vector of the camera is determined from the headset location and headset orientation. The view direction vector is normal to the display.

At step 2618, the distance is determined between the nearest BIM boundary and the headset unit based on the position and direction of the headset unit. In a preferred embodiment, a distance to target is calculated by subtracting position of the nearest BIM boundary from the position of the headset unit. The distance terminates the view direction vector.

At step 2620, the camera field of view is determined. In a preferred embodiment, the camera field of view is taken as a pyramid having an apex at the display and a 30° angel of inclination for each of 4 sides.

At step 2622, the intersection perimeter between the camera field of view and the BIM boundaries is determined. In a preferred embodiment, the intersection perimeter is determined by projecting the pyramid field of view of the camera onto the BIM boundary at which the view direction vector is terminated, to arrive at a set of coordinates which indicate the BIM boundaries that will be inside the camera view from the perspective of the user.

At step 2624, a comparison is made between the location of the indicator coordinates and the intersection perimeter. If the indicator coordinates are within the intersection perimeter, then the process moves to step 2628. If not, then the process moves to step 2626. At step 2626, the indicator coordinates outside the intersection perimeter are truncated from the display set.

At step 2628, the camera overlay image is constructed. In a preferred embodiment, the camera overlay image is constructed by producing an image of indicators matching the geometry of the indicator coordinates and then placing the image in the correct position within the boundaries of the display screen. In a preferred embodiment, the overlay image is constructed by flattening the 3-dimensional image of the indicator coordinates to an X Y position within the display coordinates.

At step 2630, the process activates and retrieves the video image from the camera. At step 2632, the processor enters a subroutine to track the physical movement of the headset unit, as will be further described. At step 2634, the processor enters a subroutine that translates and rotates the position of the indicator coordinates to match the device movement to provide the illusion that the indicator image is fixed on the BIM boundary in the background, as will be further described. Changes in position or orientation of the headset unit are used to update the location of the indicator image as the headset unit is moved in space.

At steep 2636, the video image and the overlay image are mathematically combined, as will be further described.

At step 2638, the combined video image and overlay image are sent to the display.

At step 2640, the processor checks for an interrupt indicating a termination request. If a termination request is received the process moves to step 2642. If not, the processor moves to step 2644.

At step 2644, the processor determines whether or not the orientation or the position of the headset unit has changed by more than 20%. If not, then the headset position does not need to be recalibrated and the process returns to step 2630.

If so, then the headset position needs to be recalibrated and the processor returns to step 2616.

At step 2642, the process terminates.

Referring to FIG. 27, an example of C code used in a preferred embodiment to obtain sensor readings and calculate azimuth, roll, pitch, yaw and magnetic field as required by step 2624 is shown.

Referring to FIG. 28, axis definition used in a preferred embodiment are described. Coordinate system 2800 for the headset unit will be described.

Headset unit 2300 is oriented such that "y" is forward facing away from and normal to the display. Likewise, the "−y" direction is rearward facing. Similarly, the positive "x" direction is to the right of the headset unit. The negative "x" direction is to the left of the headset unit. "Z" is the positive vertical axis. Likewise, "−z" is the downward vertical axis.

Rotation about the y axis is referred to as roll.
Rotation about the x axis is referred to as pitch.
Rotation about the z axis is referred to as yaw.

Referring FIGS. 29A and 29B, an example of C code that carries out the track movement subroutine of step 2632 is shown.

Figure 30:
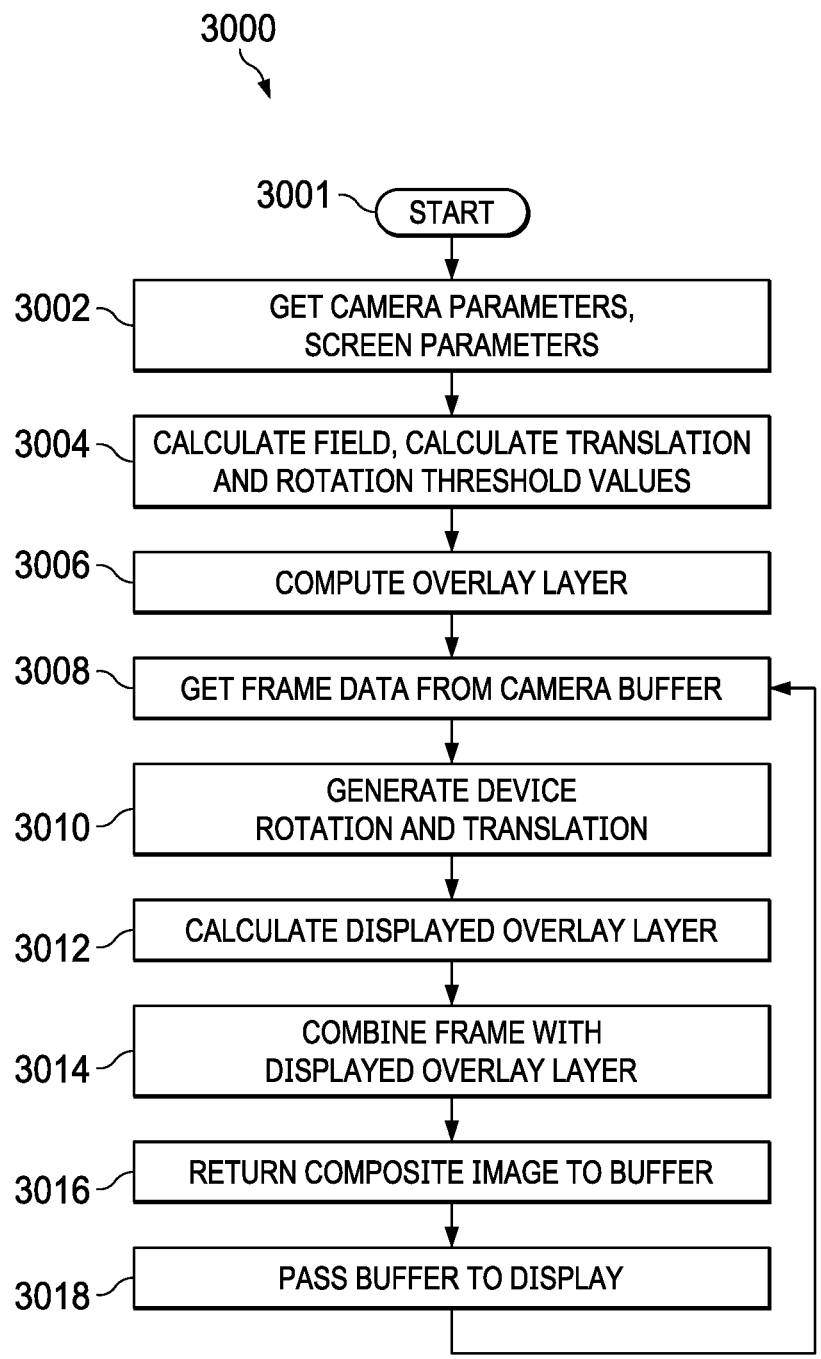
FIG. 30 is a flow chart of a preferred method to generate an AR display.

Referring to FIG. 30, the method of step 2634 will be further described as method 3000.

At step 3001, the subroutine starts.

At step 3002, the camera field of view parameters and device screen parameters are fetched by the appropriate function calls. The angles corresponding to the camera field of view and dimensions of the device display resolution are stored in memory.

At step 3004, a field is calculated at an arbitrary distance D in front of the camera. The camera field of view vertical angle $\theta_y$ and horizontal angle $\theta_x$ are used to express the vertical and horizontal dimensions X and Y of the field as follows:

$$Y = 2 \times D \times \tan\left(\frac{\theta_y}{2}\right) \qquad \text{Eq. 2}$$

$$X = 2 \times D \times \tan\left(\frac{\theta_x}{2}\right) \qquad \text{Eq. 3}$$

After the field is calculated, the amount of translation and rotation of the field that will result in a single pixel shift, T and R, can be calculated using the device display parameters retrieved. The amount of translation representing one pixel of vertical shift is saved in memory as $T_y$, horizontal translation as $T_x$, and the amount of rotation corresponding to one pixel of shift from pitch, yaw, and roll is saved as $R_\alpha$, $R_\beta$, and $R_\gamma$.

At step 3006, the overlay layer is calculated. The overlay layer positions the overlay image in a transparent image of the same dimensions, in pixels, as the device display, and the resulting composite image is saved in memory. In one embodiment, the overlay image can be scaled to be larger or smaller, depending on the arbitrary distance D, before the overlay layer is saved in memory.

At step 3008, the frame data from the camera buffer is fetched for editing. The function returns a bitmap from the device camera that can be altered. In one embodiment, the camera buffer is locked to prevent other threads or applications from editing the frame data.

At step 3010, the tracking subroutine generates device rotation and translation data.

At step 3012, the portion of the overlay layer to be displayed is calculated. The device rotation readings are compared to $R_\alpha$, $R_\beta$, and $R_\gamma$, and the translation readings are compared to $T_y$ and $T_x$. Rotation or translation in any dimension or direction that is less than the T and R values representing one pixel of shift are ignored. For any rotation or translation greater than a one pixel shift, the overlay layer is truncated in a given dimension by the number of pixels that have been shifted out of the field. In this way, indicator coordinates that are not visible to the viewer of the display are eliminated.

At step 3014, the image from the camera buffer that was returned in step 3008 is edited to form a composite image with the overlay layer. The composite image consists of the camera frame data and the displayed portion of the overlay layer combined. If the combination assigns any pixel a value from both the camera frame data and from the overlay layer, the camera frame data is ignored and the overlay layer pixel value is assigned. The resulting composite image shows the camera frame data for all transparent portions of the overlay layer with the overlay image superimposed on the camera image for all non-transparent portions.

At step 3016, the camera buffer is unlocked and the composite image is returned the buffer. At step 3018, the buffer data is passed to the screen for display. The function then returns to step 3008. The displayed overlay layer is passed on as the new overlay layer when the function returns.

Figure 31:
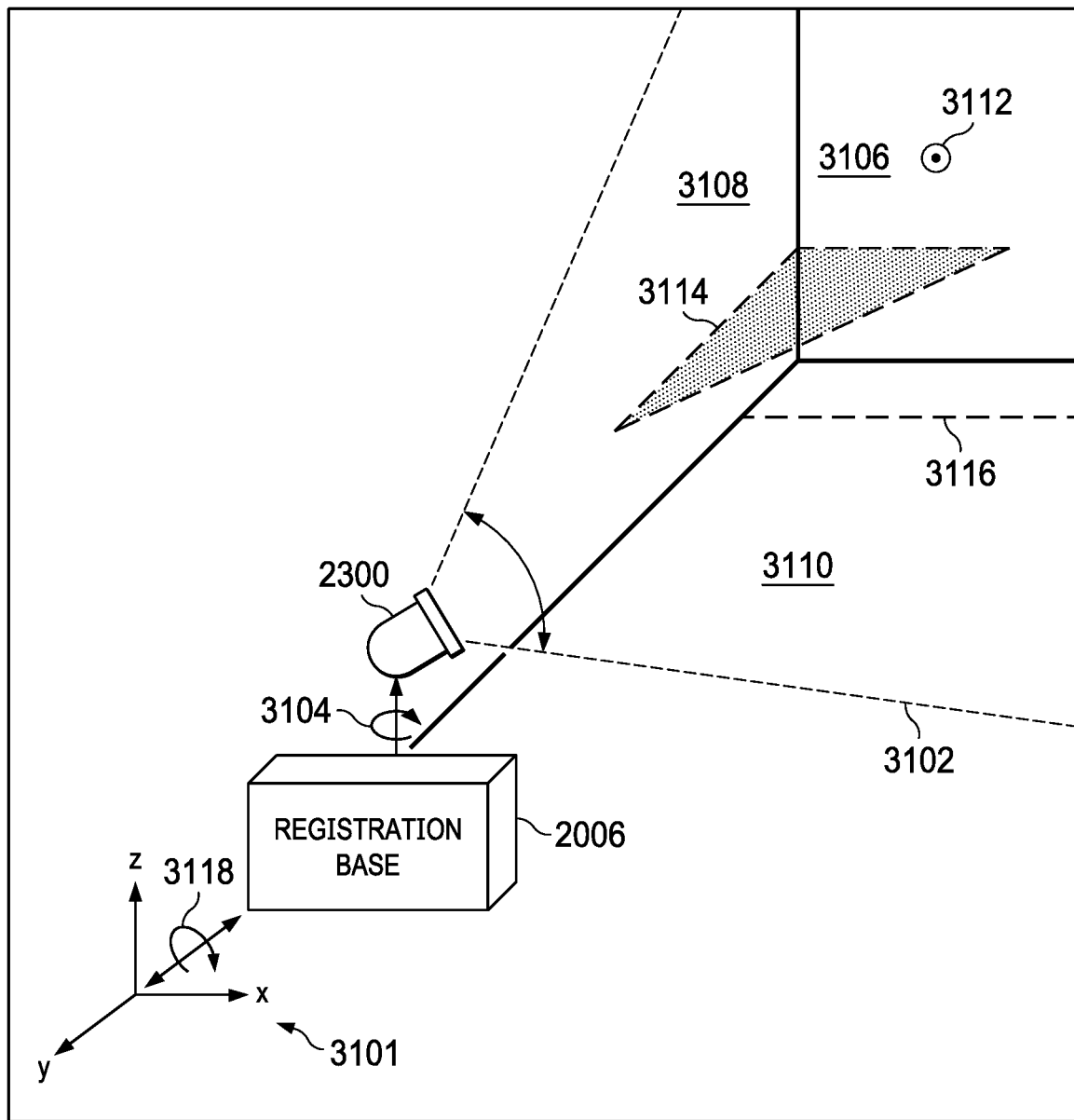
FIG. 31 is a diagram of a preferred system in use.

Referring to FIG. 31, an example of use of the device will be described.

Registration base 2006 is placed on a non-moving surface within a construction site. The origin of the registration base is placed at the BIM origin or at a certain known offset translation and rotation 3118 from BIM origin 3101. The headset is activated. When an indicator light on the headset indicates that the head set is initialized, then headset unit 2300 is removed from registration base 2006 and moved through some translation and rotation 3104.

Headset unit 2300 includes field of view 3102. Field of view 3102 encompasses wall 3106, wall 3108 and floor 3110 of the construction site. An augmented reality view of the walls and floor are then shown on display 2316 within headset unit 2300. The display shows the virtual presence of indicator point 3112, indicator plane 3114, and indicator line 3116. Of course, this is simply one example, the indicator points, planes and lines can be in any of an infinite number of positions and orientations. The indicator points, planes and lines can be used for positioning of equipment or other construction purposes. Importantly, as the headset unit is moved, the display changes to maintain the apparent position of the indicator points with respect to the walls, floor and ceiling of the construction environment.

An example of the display apparent to user 2401 will be described.

Figure 32A:
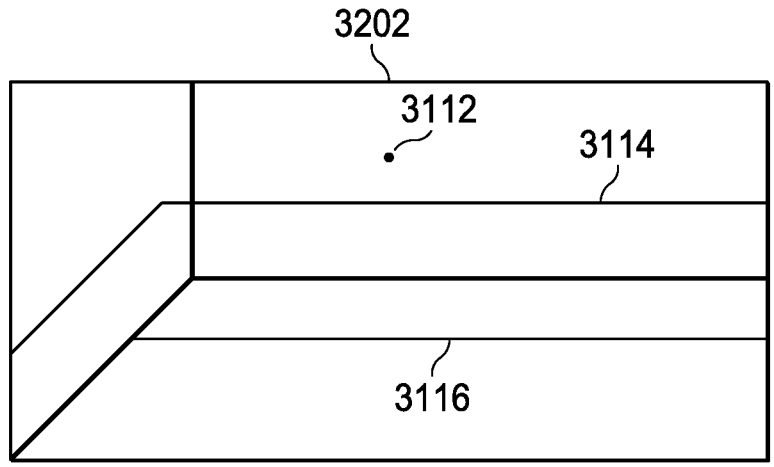
FIGS. 32A and 32B are preferred system displays of the system when in use.
Figure 32B:
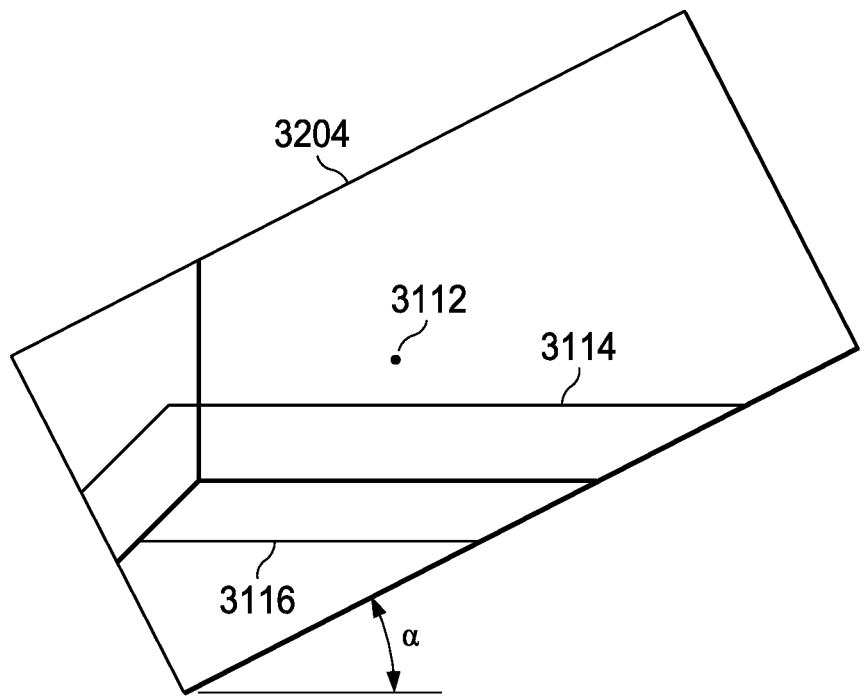

Referring to FIGS. 32A and 32B, an example of rotation of the display and the effect that it has on the view of the user will be described.

Unrotated view 3202 displays indicator point 3112, indicator plane 3114 and indicator line 3116.

Rotated view 3204 shows the display when it is rotated through an angle α about the "y" axis in a "roll" maneuver. As can be seen, the orientation of indicator point 3112, indicator plane 3114, and indicator line 3116 remain in the same relative positions with respect to the background event while the display is moved.

It will be appreciated by those skilled in the art that the described embodiments disclose significantly more than an abstract idea including technical advancements in the field of data processing and a transformation of data which is directly related to real world objects and situations in that the disclosed embodiments enable a computer to operate more efficiently and make improvements to construction management technology. Specifically, the disclosed embodiments eliminate the remanufacture of construction components and rescheduling of equipment. Further, the disclosed embodiments eliminate the reliance and use of external positioning systems, such as GPS or laser-based systems.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. A device for projecting a building information model based on a remotely monitored set of registration marks comprising:
   a display unit, having a display screen;
   a computer processor, having a memory, operatively connected to the display unit;
   a set of registration cameras, fixed to the display unit and operatively connected to the computer processor; and
   the memory containing a set of instructions that, when executed, cause the device to:
   access an electronic image from the set of registration cameras of one or more registration marks of the set of registration marks;
   derive a viewer perspective from the electronic image;
   modify the building information model to derive a building information model view that can be seen from the viewer perspective; and
   send a first signal to the display screen based on the building information model view to be displayed as a translucent image;
   wherein the step of modifying the building information model further comprises:
   receiving a first overlay layer; and
   truncating the first overlay layer to eliminate a set of images that cannot be seen from the viewer perspective.

2. The device of claim 1, wherein the display unit further comprises:
   a headset;
   wherein the display screen further comprises a semi-transparent forward facing eye shield presenting the translucent image.

3. The device of claim 2, further comprising:
   a hard hat;
   wherein the semi-transparent forward facing eye shield is attached to the hard hat.

4. The device of claim 2, further comprising:
   a helmet; and
   a removable connector, attached to the semi-transparent forward facing eye shield and the helmet.

5. The device of claim 1, wherein the first overlay layer is one of a group of structural, electrical, plumbing, and HVAC.

6. The device of claim 1, wherein the translucent image is stereoscopic.

7. The device of claim 1, further comprising:
   a set of position sensors, operatively connected to the computer processor;
   wherein the set of instructions further comprises instructions that, when executed, cause the device to:

modify the viewer perspective based on a second signal from the set of position sensors.

8. The device of claim 7, wherein the set of position sensors further comprises at least one of a group of a gyroscope, an accelerometer, and a compass.

9. The device of claim 7, wherein the second signal is related to one of a position and an orientation of the display unit.

\* \* \* \* \*